United States Patent
Iura et al.

(10) Patent No.: US 6,815,924 B1
(45) Date of Patent: Nov. 9, 2004

(54) METHOD OF CONTROLLING AC MOTOR AND CONTROLLER

(75) Inventors: Hideaki Iura, Fukuoka (JP); Yoichi Yamamoto, Fukuoka (JP); Tomohiro Kawachi, Fukuoka (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 54 days.

(21) Appl. No.: 10/088,225

(22) PCT Filed: Sep. 13, 2000

(86) PCT No.: PCT/JP00/06271

§ 371 (c)(1),
(2), (4) Date: Mar. 19, 2002

(87) PCT Pub. No.: WO01/22570

PCT Pub. Date: Mar. 29, 2001

(30) Foreign Application Priority Data

Sep. 21, 1999 (JP) .......................................... 11-267499
Jul. 31, 2000 (JP) ....................................... 2000-231526

(51) Int. Cl.[7] ............................................... H02P 1/24
(52) U.S. Cl. ........................ 318/727; 318/798; 318/805
(58) Field of Search ........................ 318/727, 798–802, 318/805–812

(56) References Cited

U.S. PATENT DOCUMENTS

| | | | | | |
|---|---|---|---|---|---|
| 5,003,243 A | * | 3/1991 | Tadakuma et al. | .......... | 318/800 |
| 5,400,240 A | * | 3/1995 | Araki | .......... | 363/97 |
| 5,463,301 A | * | 10/1995 | Kim | .......... | 318/801 |
| 5,608,302 A | * | 3/1997 | Umida | .......... | 318/802 |
| 6,014,007 A | * | 1/2000 | Seibel et al. | .......... | 318/805 |
| 6,018,225 A | * | 1/2000 | Garces | .......... | 318/798 |
| 6,037,742 A | * | 3/2000 | Rasmussen | .......... | 318/807 |

FOREIGN PATENT DOCUMENTS

| | | |
|---|---|---|
| JP | 55-120299 | 8/1980 |
| JP | 61-1292 | 1/1986 |
| JP | 61-69395 | 4/1986 |
| JP | 61-92189 | 5/1986 |
| JP | 61-112594 | 5/1986 |
| JP | 62-210890 | 9/1987 |
| JP | 62-210892 | 9/1987 |
| JP | 63-15696 | 1/1988 |
| JP | 2-237494 | 9/1990 |
| JP | 6-153587 | 5/1994 |
| JP | 8-130882 | 5/1996 |

* cited by examiner

Primary Examiner—Rina Duda
(74) Attorney, Agent, or Firm—Sughrue Mion, PLLC

(57) ABSTRACT

A technique for controlling an AC motor. An electric power is output to the AC motor. The output current of an electric power converter is controlled based on a difference signal of an output current detection signal and a current command signal of the electric power converter. When the AC motor is in a free run condition, current control is conducted by forcing the current command signal to be zero so that a current in the AC motor is made zero. The amplitude and phase and angular velocity of a residual voltage of the AC motor are found based on a calculated output voltage command.

23 Claims, 12 Drawing Sheets

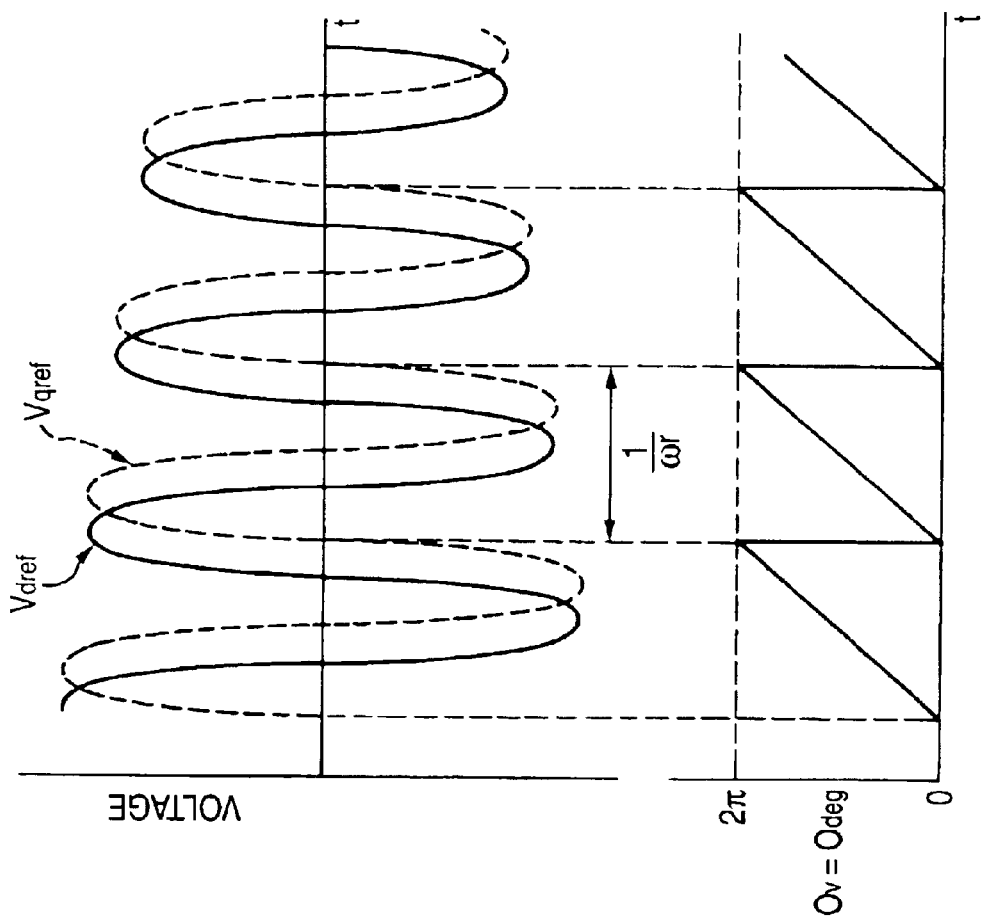
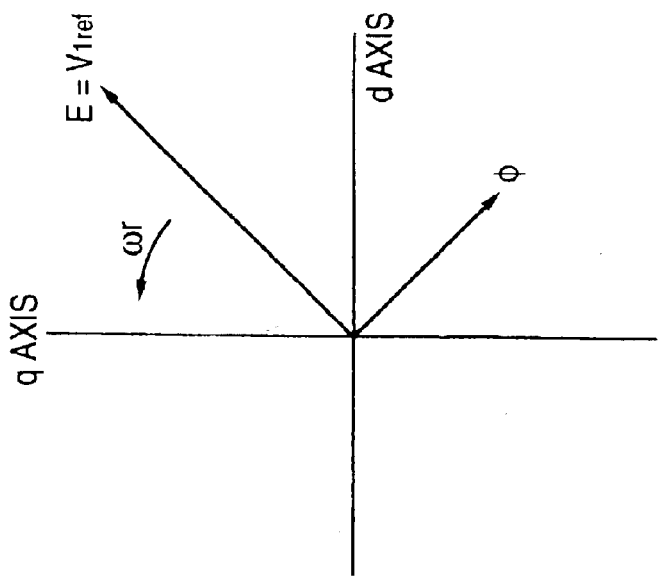

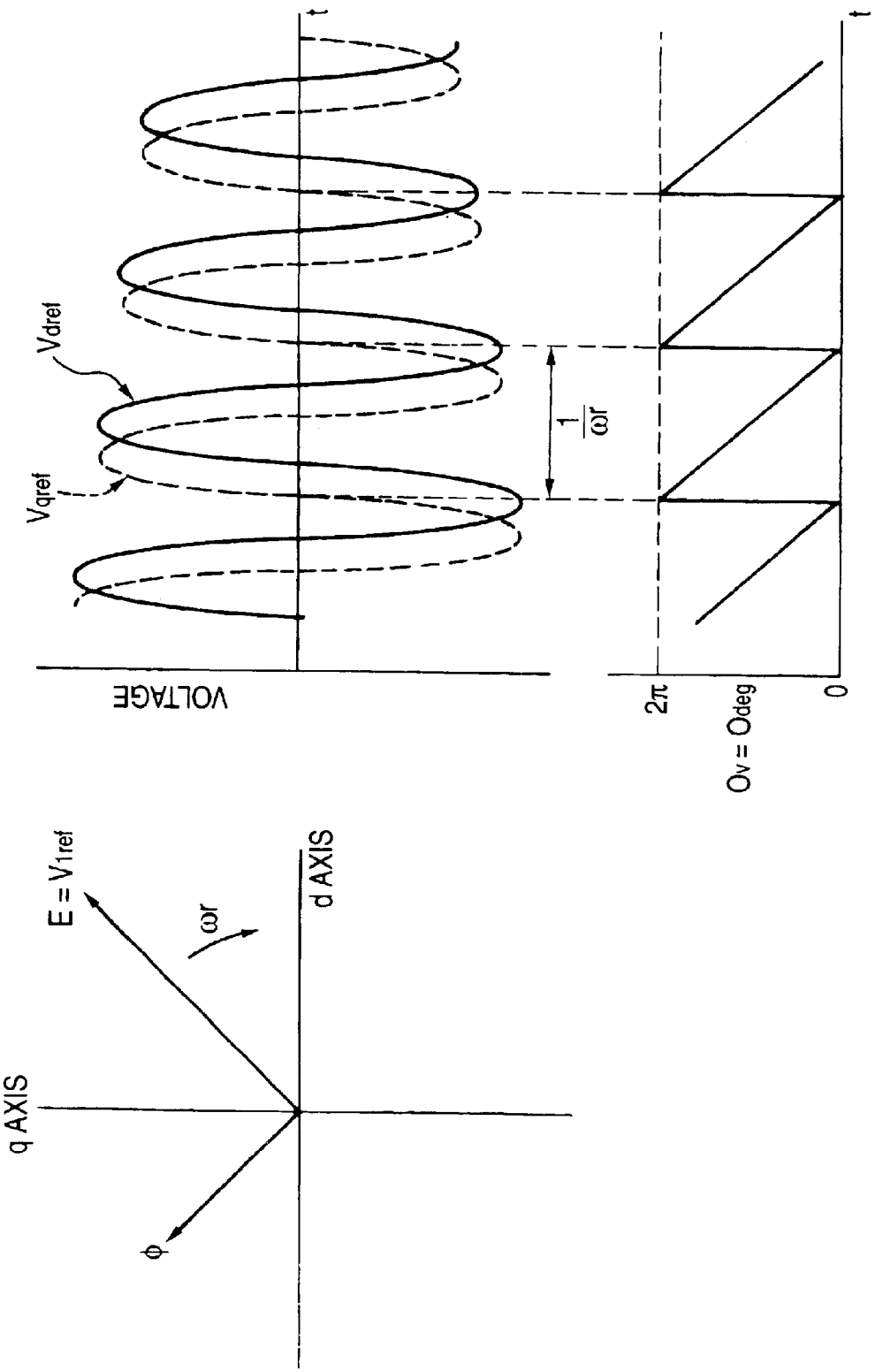

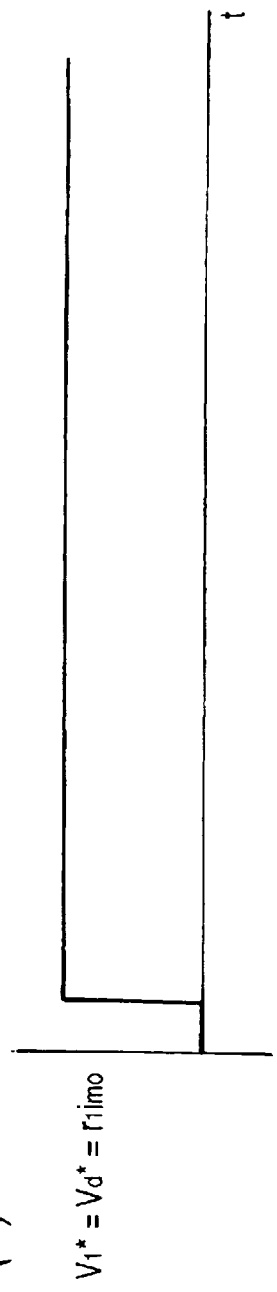
FIG. 9 (a)  $V_1^* = V_d^* = r_1 i_{mo}$
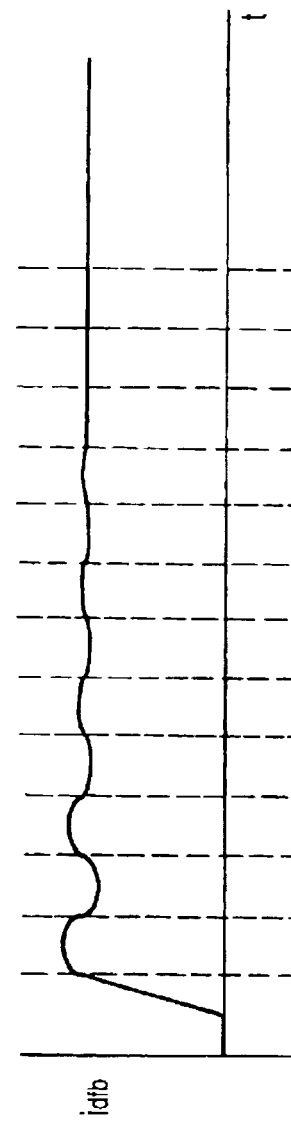
FIG. 9 (b)  idfb
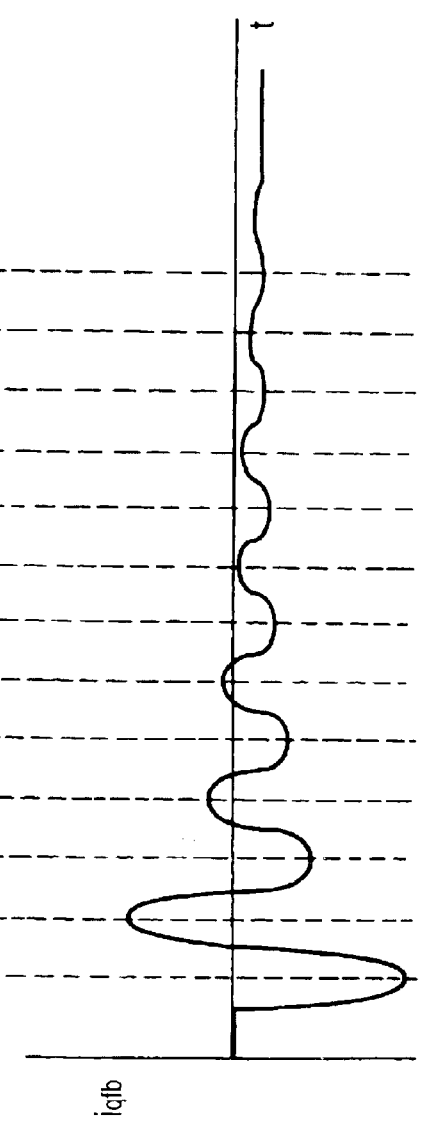
FIG. 9 (c)  iqfb

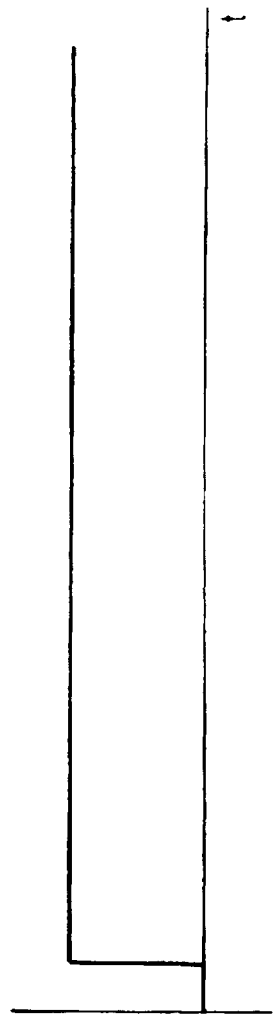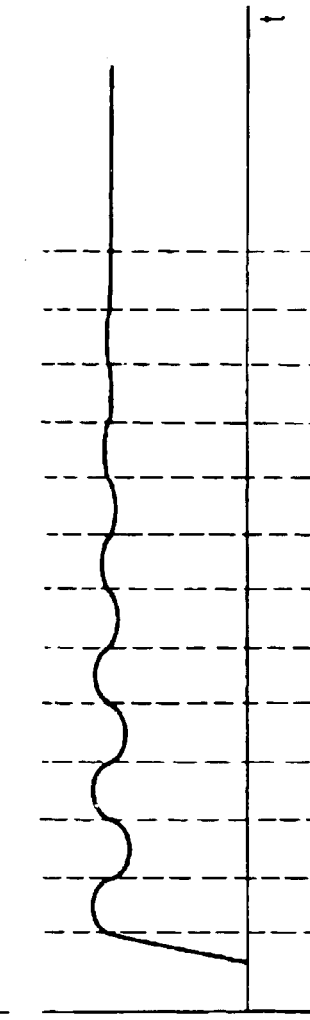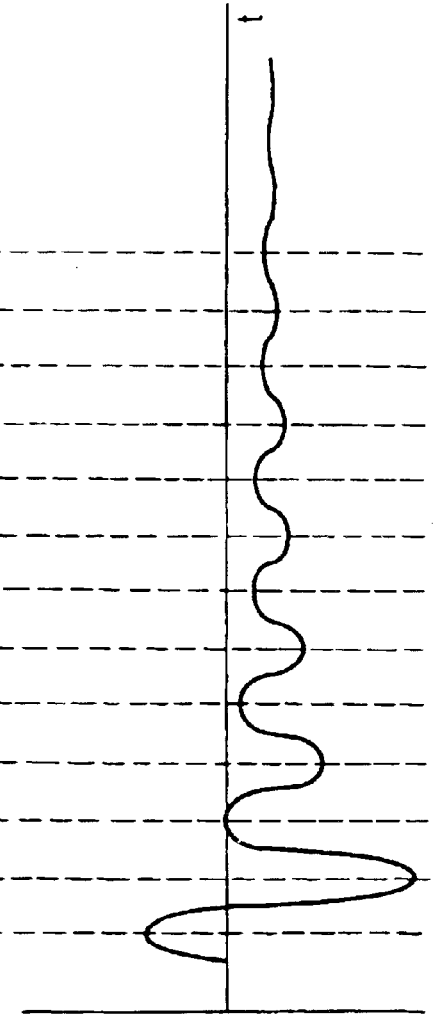
FIG. 10 (a) $V_1^* = V_d^* = r_1 i_{mo}$
FIG. 10 (b) idfb
FIG. 10 (c) iqfb

METHOD OF CONTROLLING AC MOTOR AND CONTROLLER

TECHNICAL FIELD

The present invention relates to a control method of an AC motor by which a speed of the AC motor is varied by a variable speed control apparatus to output the AC voltage, and specially to a control method and an apparatus by which the AC motor can be smoothly started after the return from the power failure.

BACKGROUND TECHNOLOGY

Conventionally, to speed control the AC motor, a V/f constant control method by which a ratio of the output voltage V and an output frequency f is made constant, is well known. Further, recently, in order to more accurately control the AC motor, a vector control to respectively independently control the primary current to be supplied to the AC motor, in the exciting current (current to generate the magnetic flux) and the torque current (current to generate the torque) which directly relate to the torque, is brought into the practical use. However, in the conventional control system, during the continuous running, the stable control is conducted, however, in the case where the instantaneous power failure is generated in the running of the AC motor once, and restarting after the instantaneous power failure is conducted, when the residual voltage of the AC motor and the phase of the voltage command of the variable speed control apparatus are not matched, the speed of the AC motor is rapidly changed, or a slip of the AC motor is increased, thereby, the over current flows, resulting in a danger such as a trip. In order to prevent this, it is necessary that the residual voltage of the AC motor and the phase of the voltage command of the variable speed control apparatus are matched, and the re-running is conducted, however, the matching of the phase is very difficult. Therefore, because, after the residual voltage does not exist, the angular velocity of the AC motor and the output frequency of the variable speed control apparatus are calculated from the speed detector, or the residual voltage of the AC motor is detected by the voltage detector, and by being calculated from its frequency component, the phases of the residual voltage and the output voltage command signal are made to coincide with each other, and re-running is conducted, there is a problem that the restart after the instantaneous power failure takes a long period of time, or a smooth re-running is difficult.

As described above, in order to smoothly start the AC motor, there is a problem that it is necessary to wait that the residual voltage does not exist, or the detector such as the speed detector or voltage detector is necessary.

Accordingly, the object of the present invention is to provide the control method and control apparatus of the AC motor by which, by accurately measuring the phase and angular velocity of the residual voltage of the AC motor after the recovery of the instantaneous power failure, the re-running can be quickly and smoothly conducted.

DISCLOSURE OF THE INVENTION

The summary of a control method and control apparatus of the AC motor of the present invention to solve the above problem, exists in the following (1) to (23).

(1) A control method of an AC motor which is characterized in that: it has an electric power converter to output the electric power to the AC motor, and is provided with a current control section to control the output current of the electric power converter based on the difference signal of the current command signal and the output current detection signal of the electric power converter, and when the AC motor is in a free run condition, the current command signal is forcibly made zero so that the current of the AC motor is made zero, and current controlled, and on the base of the output voltage command signal which is calculated by using the current control section output at this time, the amplitude and phase and angular velocity of the residual voltage of the AC motor are obtained.

(2) A control method of an AC motor according to (1), wherein, when the phase and the angular velocity of the residual voltage of the AC motor are obtained based on the output voltage command signal, a signal holding means is provided, and the amplitude, and phase and angular velocity of the residual voltage are obtained from the addition value of the phase command signal just before the AC motor free runs, and the phase signal of the output voltage command signal.

According to this control method of the AC motor, in the case where the AC motor is in the free run condition, when it is controlled so that the current of the AC motor becomes zero, it is utilized as this result that the residual voltage of the AC motor appears in the voltage command signal, the amplitude and phase and angular velocity of the residual voltage of the AC motor which is in the free run condition, are obtained on the base of the phase and angular frequency of the this voltage command signal. Thereby, the smooth speed-return after the power failure recovery becomes easy.

Further, when the phase and angular velocity of the residual voltage are searched, a signal holding means is provided, and because the phase and angular velocity of the residual voltage are searched from the addition value of the phase command signal and the phase signal of the output voltage command signal just before the AC motor free-runs, there is no discontinuity of the phase command signal and a disadvantage such as the mechanical shock occurrence can be prevented.

(3) A control method of an AC motor which is characterized in that: in the control method by which an arbitrary electric power is outputted to the AC motor by the electric power converter, and the current supplied to the motor is detected by the current detection circuit, and it is controlled by the current control circuit so that the given current command and the current detection value detected by the current detection circuit coincide to each other, and the switching of the electric power converter is determined from the voltage command outputted from the current control circuit, the electric power converter is controlled by a start control circuit so that it is normally operated at the start time, and the speed of the AC motor in the free run condition is estimated by a speed estimation circuit.

(4) A control method of an AC motor according to (3), wherein the start control circuit forcibly makes the current command zero, and by the current control circuit, the voltage command so that the current detection value is made zero, is calculated, and by the time change of the voltage command, the speed estimation circuit estimates the speed of the AC motor.

(5) A control method of an AC motor according to either one of (3) or (4), wherein the start control circuit forcibly makes the current command zero, and by the current control circuit, the voltage command by which the current detection value is made zero, is calculated, and when its voltage level is lower than the set voltage level, after the set-level DC current command is applied for a set time period from zero, the current command is forcibly made zero again, and by the current control circuit, the voltage command by which the current detection value is made zero, is calculated, and the speed estimation circuit estimates the speed of the AC motor.

(6) A control method of an AC motor according to any one of (3) to (5), wherein the start control circuit forcibly makes the current command zero, and by the current control circuit, the voltage command by which the current detection value is made zero, is calculated, and when its voltage level is lower than the set voltage level, after the set level DC current command is applied for a set time period from zero, the current command is forcibly made zero again, and by the current control circuit, even when the voltage command by which the current detection value is made zero, is calculated, when that voltage level is lower than the set voltage level, the speed estimation circuit estimates that the AC motor is stopped.

(7) A control method of an AC motor according to any one of (1) to (6), wherein the start control circuit forcibly makes the current command zero, and by the current control circuit, the voltage command so that the current detection value is made zero, is calculated, and by the time change of the voltage command, the speed estimation circuit starts the AC motor when the estimated AC motor speed and the amplitude and the phase of the voltage command are made the initial value.

(8) A control method of an AC motor according to any one of (1) to (7), wherein the start control circuit forcibly makes the current command zero, and by the current control circuit, the voltage command so that the current detection value is made zero, is calculated, and by the time change of the voltage command, when the speed estimation circuit starts the AC motor when the estimated AC motor speed and the amplitude and the phase of the voltage command are made the initial value, until the amplitude of the voltage command outputted from the electric power converter is brought into the voltage level corresponding to the normal induced voltage to the speed of the AC motor, the voltage command is gradually increased.

(9) A control apparatus of an AC motor which is characterized in that: in the control apparatus of the AC motor which has the electric power converter to output an arbitrary electric power to the AC motor; the current detection circuit by which the current supplied to the motor is detected; the current control circuit to control so that the given current command and the current detection value detected by the current detection circuit coincide with each other; and by which the switching of the electric power converter is determined from the voltage command outputted from the current control circuit, the apparatus has the start control circuit, and the speed estimation circuit by which the speed of the AC motor in the free run condition is estimated.

(10) A control apparatus of an AC motor according to (9), wherein the start control circuit forcibly makes the current command zero, and by the current control circuit, the voltage command so that the current detection value is made zero is calculated, and by the time change of the voltage command, the speed estimation circuit estimates the speed of the AC motor.

(11) A control apparatus of an AC motor according to either one of (9) or (10), wherein the start control circuit forcibly makes the current command zero, and by the current control circuit, the voltage command so that the current detection value is made zero is calculated, and when its voltage level is lower than the set voltage level, after the set level DC current command is applied for a set time period from zero, the current command is forcibly made zero again, and by the current control circuit, the voltage command so that the current detection value is made zero, is calculated, and the speed estimation circuit estimates the speed of the AC motor.

(12) A control apparatus of an AC motor according to any one of (9) to (11), wherein the start control circuit forcibly makes the current command zero, and by the current control circuit, the voltage command so that the current detection value is made zero is calculated, and when its voltage level is lower than the set voltage level, after the set level DC current command is applied for a set time period from zero, the current command is forcibly made zero again, and by the current control circuit, even when the voltage command so that the current detection value is made zero, is calculated, when its voltage level is lower than the set voltage level, the speed estimation circuit estimates that the AC motor is stopped.

(13) A control apparatus of an AC motor according to any one of (9) to (12), wherein the start control circuit forcibly makes the current command zero, and by the current control circuit, the voltage command by which the current detection value is made zero, is calculated, and by the time change of the voltage command, the speed estimation circuit makes the estimated speed of the AC motor and the amplitude and phase of the voltage command the initial value, and starts the AC motor.

(14) A control apparatus of an AC motor according to any one of (9) to (13), wherein the start control circuit forcibly makes the current command zero, and by the current control circuit, the voltage command by which the current detection value is made zero, is calculated, and by the time change of the voltage command, when the speed estimation circuit makes the estimated speed of the AC motor and the amplitude and phase of the voltage command the initial value, and starts the AC motor, the amplitude of the voltage command outputted from the electric power converter is gradually increased up to the voltage level corresponding to the normal induced voltage to the speed of the AC motor.

(15) A control method of an AC motor according to (3), wherein the start control circuit forcibly makes the current command zero, and by the current control circuit, the voltage command by which the current detection value is made zero, is calculated, and when the voltage command is larger than the set voltage level, by the time change of the phase of the voltage command, the speed estimation circuit estimates the speed of the AC motor, and as the initial value when the electric power converter is started, the amplitude and phase of the voltage command and the frequency corresponding to the speed estimation value of the AC motor are set, and the electric power converter is started.

(16) A control method of an AC motor which is characterized in that: the apparatus has an electric power converter to output the electric power to the AC motor; the current control section to control the output current of the electric power converter based on the difference signal of the current command signal and the output current detection signal of the electric power converter; and when the AC motor is in the free run condition, the arbitrary DC current is supplied to the AC motor for a set time period, and the frequency component appeared in the output current detection signal of the electric power converter is detected, and from the frequency component, the speed of the AC motor is estimated.

(17) A control method of an AC motor according to (3), wherein the start control circuit forcibly makes the current command zero, and by the current control circuit, the voltage command by which the current detection value is made zero, is calculated, and when its voltage level is lower than the set voltage level, the set level DC current command or the set level DC voltage command is applied for a set time period from zero, and the speed estimation circuit detects the frequency component appeared in the current detection value, and this frequency component is estimated as the speed of the AC motor, and as the initial value when the electric power converter is started, the frequency corresponding to the speed estimation value of the AC motor is set, and the electric power converter is started.

(18) A control method of an AC motor according to (3), wherein the start control circuit forcibly makes the current command zero, and by the current control circuit, the voltage command by which the current detection value is made zero, is calculated, and when the voltage command is lower than the set voltage level, the current command value is changed from zero to the set level DC current command value, and this is applied for a set time period, and after that, the sign and amplitude of the current command are changed, and it is applied for a set time period. A control method of an AC motor is characterized in that, at this time, the speed estimation circuit detects the frequency component appeared in the current detection value, and it estimates the frequency component as the speed of the AC motor, and as the initial value when the electric power converter is started, the frequency corresponding to the speed estimation value of the AC motor is set, and the electric power converter is started.

(19) A control method of an AC motor according to (3), wherein the start control circuit forcibly makes the current command zero, and by the current control circuit, the voltage command by which the current detection value is made zero, is calculated, and when the voltage command is lower than the set voltage level, the current control is stopped, and the DC voltage command is applied in the arbitrary direction for a set time period, and after that, the arbitrary amplitude current command is given in the direction in which the phase is changed by 180° from the command direction of the DC voltage, and the current control is conducted again for a set time period. A control method of an AC motor characterized in that, at this time, the speed estimation circuit detects the frequency component appeared in the current detection value, and estimates the frequency component as the speed of the AC motor, and as the initial value when the electric power converter is started, the frequency corresponding to the speed estimation value of the AC motor is set, and the electric power converter is started.

(20) A control apparatus of an AC motor according to (9), wherein the start control circuit forcibly makes the current command zero, and by the current control circuit, the voltage command by which the current detection value is made zero, is calculated, and when the voltage command is larger than the set voltage level, by the time change of the phase of the voltage command, the speed estimation circuit estimates the speed of the AC motor, and as the initial value when the electric power converter is started, the amplitude and phase of the voltage command and the frequency corresponding to the speed estimation value of the AC motor are set, and the electric power converter is started.

(21) A control apparatus of an AC motor according to (9), wherein the start control circuit forcibly makes the current command zero, and by the current control circuit, the voltage command by which the current detection value is made zero, is calculated, and when the voltage command is lower than the set voltage level, the set level DC current command, or the set level DC voltage command is applied for a set time period from zero, and the speed estimation circuit detects the frequency component appeared in the current detection value, and estimates the frequency component as the speed of the AC motor, and as the initial value when the electric power converter is started, the frequency corresponding to the speed estimation value of the AC motor is set, and the electric power converter is started.

(22) A control apparatus of an AC motor according to (9), wherein the start control circuit forcibly makes the current command zero, and by the current control circuit, the voltage command by which the current detection value is made zero, is calculated, and when the voltage command is lower than the set voltage level, the current command value is changed from the zero to the set level DC current command vale, and it is applied for a set time period, and after that, the sign and the amplitude of the current command are changed, and applied for a set time period. The control apparatus of the AC motor is characterized in that, at this time, the speed estimation circuit detects the frequency component appeared in the current detection value, and estimates the frequency component as the speed of the AC motor, and as the initial value when the electric power converter is started, the frequency corresponding to the speed estimation value of the AC motor is set, and the electric power converter is started.

(23) A control apparatus of an AC motor according to (3), wherein the start control circuit forcibly makes the current command zero, and by the current control circuit, the voltage command by which the current detection value is made zero, is calculated, and when the voltage command is lower than the set voltage level, the current control is stopped, and the DC voltage command is applied in the arbitrary direction for a set time period, and after that, the arbitrary amplitude current command is given in the direction in which the phase is changed by 180° from the command direction of the DC voltage, and the current control is conducted again for a set time period. The control apparatus of the AC motor characterized in that, at this time, the speed estimation circuit detects the frequency component appeared in the current detection value, and estimates the frequency component as the speed of the AC motor, and as the initial value when the electric power converter is started, the frequency corresponding to the speed estimation value of the AC motor is set, and the electric power converter is started.

BRIEF DESCRIPTION OF THE DRAWINGS

FIGS. 6(a) and 6(b) are diagrams showing the relationship between the locus of the residual voltage of the AC motor and the output voltage command and phase (at the time of normal rotation) of a current controller.

FIGS. 7(a) and 7(b) are diagrams showing the relationship between the locus of the residual voltage of the AC motor and the output voltage command and phase (at the time of reverse rotation) of the current controller.

FIGS. 9(a) to 9(c) show the diagrams showing a variation (normal rotation) of the current detection value when a d-axis voltage is given to the AC motor.

FIGS. 10(a) to 10(c) show the diagrams showing a variation (reverse rotation) of the current detection value when the d-axis voltage is given to the AC motor.

Figure 1:
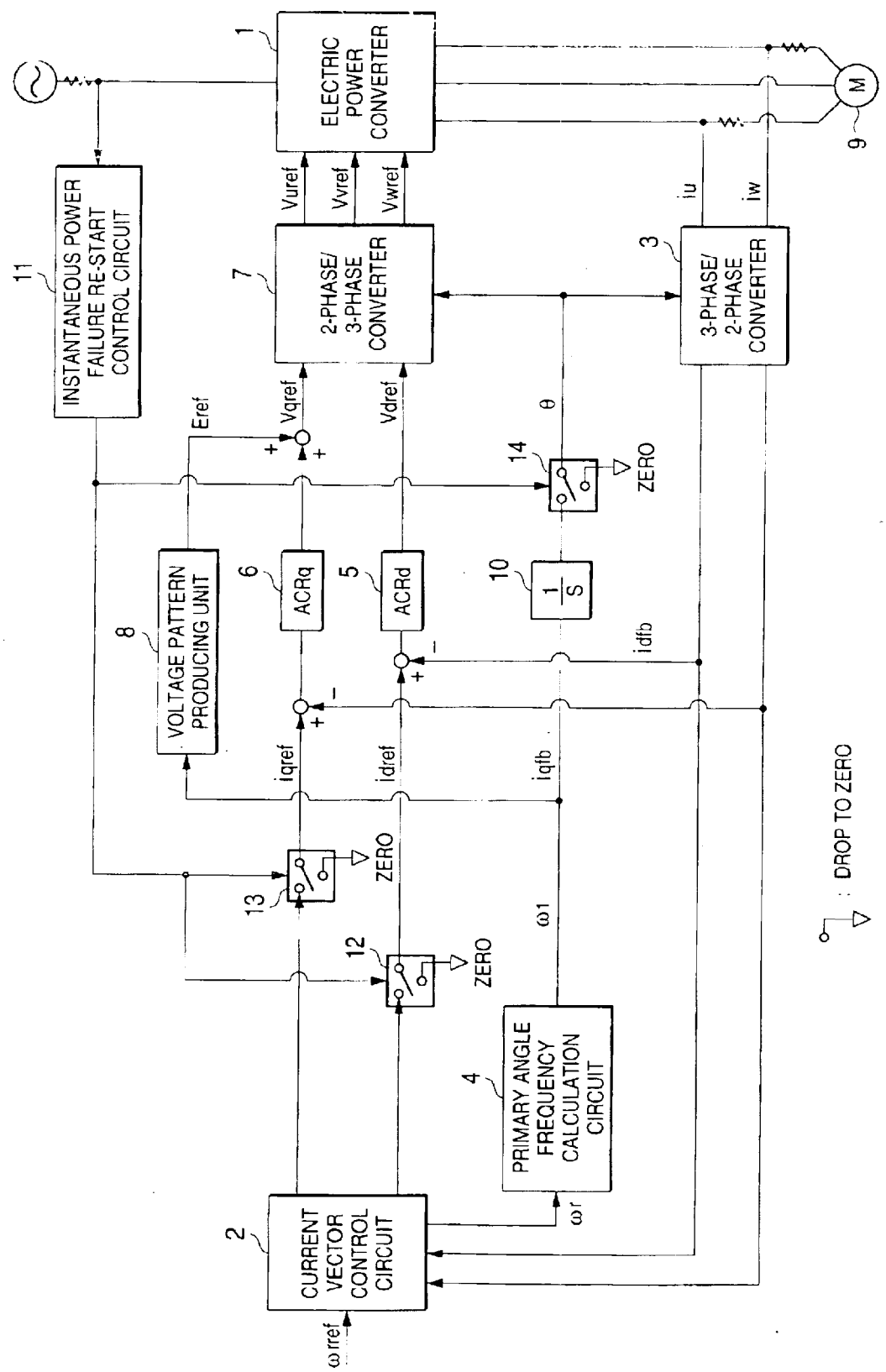
FIG. 1 is a block diagram of a variable speed control apparatus of an AC motor according to the first embodiment of the present invention.

In this connection, as a reference numeral in the drawings, numeral 1 is an electric power converter, numeral 2 is a current vector control circuit, numeral 3 is a 3 phase/2 phase converter, numeral 4 is a primary angular frequency calculation circuit, numeral 5 is an exciting current control circuit, numeral 6 is a torque current control circuit, numeral 7 is a 2 phase/3 phase converter, numeral 8 is a voltage pattern producer, numeral 9 is an AC motor, numeral 10 is an integrator, numeral 11 is an instantaneous power failure re-start control circuit, numeral 12 is a magnetizing current command switching unit, numeral 13 is a torque current switching unit, numeral 14 is a phase command switching unit, numeral 15 is a signal holding circuit, numeral 70 is a voltage command amplitude calculator, numeral 71 is a voltage command phase calculator, numeral 72 is a voltage command converter, numeral 201 is an electric power converter, numeral 202 is an AC motor, numeral 203 is a current detector, numeral 204 is a current coordinate converter circuit, numeral 205 is a torque current control circuit, numeral 206 is an exciting current control circuit, numeral 207 is a phase calculation circuit, numeral 208 is a V/f converter circuit, numeral 209 is an output voltage calculation circuit, numeral 210 is a switching pattern generation circuit, numeral 211 is an instantaneous power failure re-start control circuit, numeral 212 is a speed estimation circuit, numeral 212A is a speed estimation circuit(when the residual voltage exists), and numeral 212B is a speed estimation circuit (when no residual voltage exists).

BEST MODE FOR CARRYING OUT THE INVENTION

Figure 2:
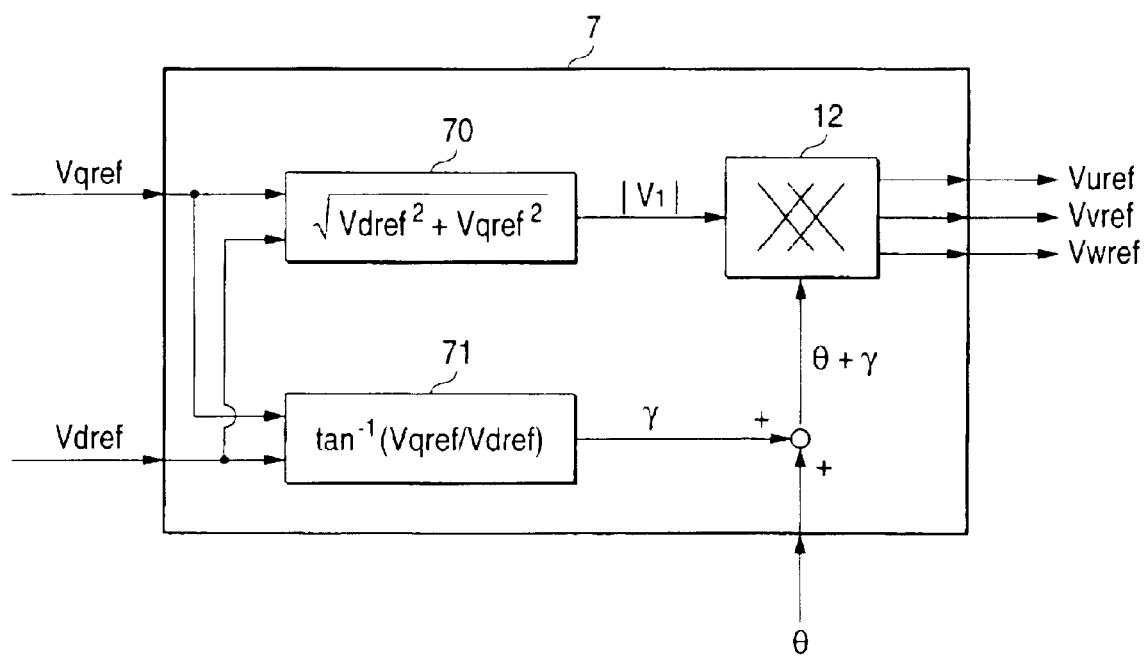
FIG. 2 is a block diagram showing the structure of a 2 phase/3 phase converter shown in FIG. 1.
Figure 3:
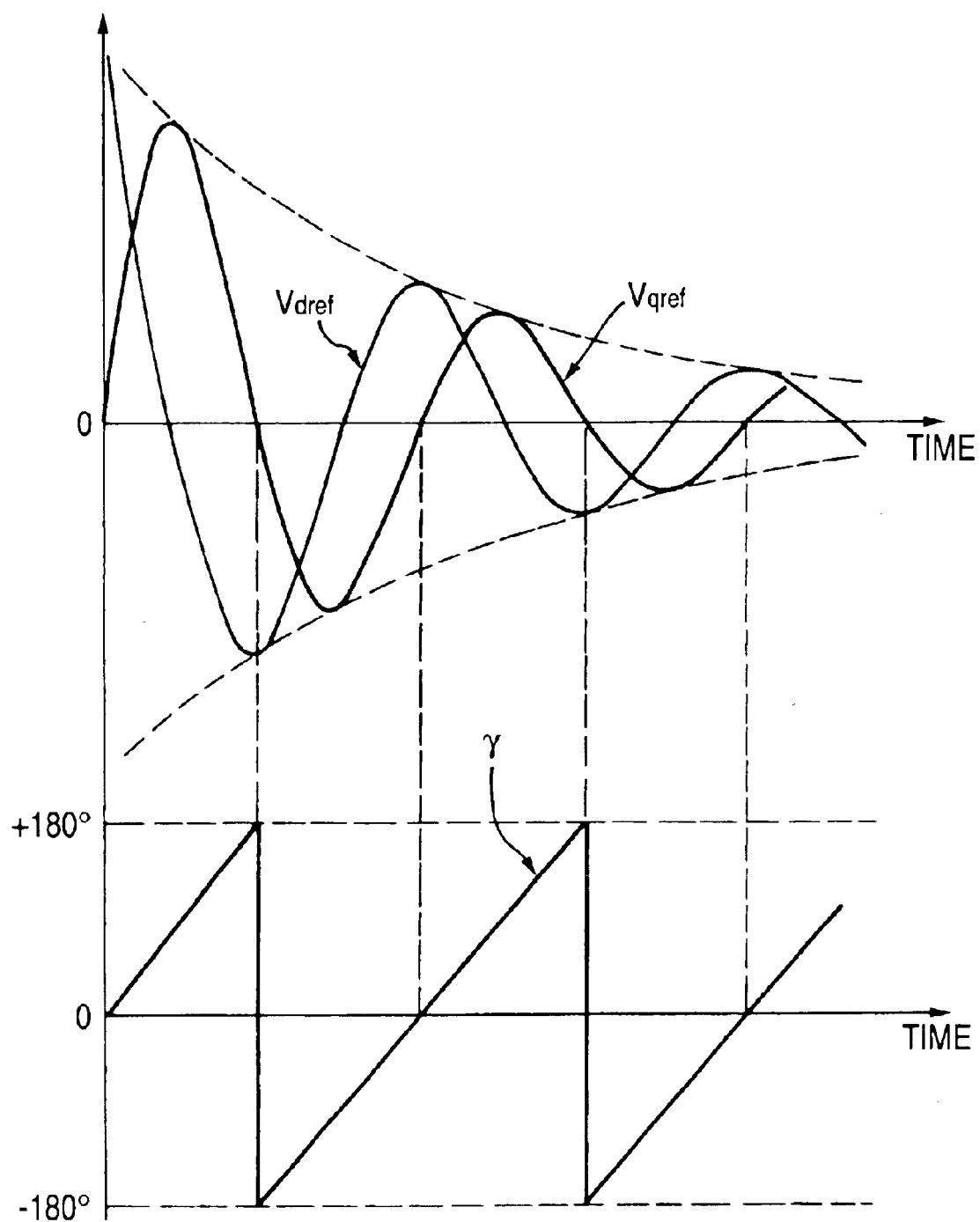
FIG. 3 is a view showing the operation wave form at the time of free run condition of the AC motor shown in FIG. 1.

Referring to the drawings, the present invention will be described below. Initially, referring to FIG. 1 to FIG. 3, the first embodiment of the present invention will be described. FIG. 1 is a block diagram of the variable speed control apparatus of an AC motor according to the first embodiment of the present invention, and FIG. 2 is a block diagram showing a structure of a 2 phase/3 phase converter shown in FIG. 1. Further, FIG. 3 is a view showing an operation waveform in the free run condition of the AC motor shown in FIG. 1.

In FIG. 1, in the variable speed control apparatus, an electric power converter 1 by which, after an AC power source from the 3 phase AC power source is converted into a DC power, it is converted again into the AC power of an arbitrary frequency and voltage by an inverter by the PWM control system, and this primary frequency and the primary voltage are supplied to an AC motor 9; a current vector control circuit 2 by which, a speed command signal ωr ref inputted from the outside is inputted, and from an exciting current detection value idfb outputted from a 3 phase/2 phase converter 3 and a torque current detection value iqfb, a speed estimation signal ωr is obtained; the 3 phase/2 phase converter 3 by which the primary current (U phase current iu, W phase current iw) to the AC motor 9 is detected, and the exciting current detection value idfb which is coordinate-transformed, and the torque current detection value iqfb are sent out; a primary angular frequency calculation circuit 4 by which, from the speed estimation signal ωr from the current vector control circuit 2, it is calculated into the primary angular frequency signal ω1 and outputted; an exciting current control circuit (ACR d) 5 by which the exciting current directional voltage provided so that the exciting current command value id ref and the exciting current detection value idfb from the 3 phase/2 phase converter 3 coincide with each other, is controlled; a torque current control circuit (ADR q) 6 by which the torque current directional voltage provided so that the torque current command value iq ref outputted from the current vector control circuit 2 and the torque current detection value iqfb outputted from the 3 phase/2 phase converter 3 coincide with each other, is controlled; a 2 phase/3 phase converter 7 by which the PWM signal of the voltage command signal (Vuref, Vvref, Vwref) of each phase of U, V, W is generated and outputted; a V/f converter circuit 208 by which the induced voltage command signal Eref is made so that the induced voltage of the AC motor is compensated based on the primary angular frequency signal ω1 from a primary angular frequency calculation circuit 4; an integrator 10 by which the primary angular frequency signal ω1 from the primary angular frequency calculation circuit 4 is integrated in the same manner; an instantaneous power failure detection re-start control circuit 11 by which, after the instantaneous power failure is detected, the procedure up to the re-running is controlled; a magnetizing current command switching unit 12 by which, by the instantaneous power failure signal from the instantaneous power failure detection re-start control circuit 11, the exciting current command value is switched; a torque current command switching unit 13 by which, in the same manner, by the instantaneous power failure signal, the torque current command value is switched; and a phase command switching unit 14 by which, in the same manner, by the instantaneous power failure signal, the phase command signal is switched, are provided.

In this connection, the output signal of the exciting current control circuit (ACR d) 5 becomes the d-axis voltage command value Vdref, and the additional value of the output signal of the torque current control circuit (ACR q) 6 and the output signal Eref of the V/f converter circuit 208 becomes the q-axis voltage command value Vqref. Further, the output signal of the integrator 10 is inputted into the 3 phase/2 phase converter 3 and the 2 phase/3 phase converter 7 as the phase command signal θ. In FIG. 2, a voltage command amplitude calculator 70 which calculates the amplitude |V1| of the output voltage command signal V1, as $|V1|=(Vdref^2+Vqref^2)^{1/2}$, from the d-axis voltage command value Vdref and the q-axis voltage command value Vqref, a voltage command phase calculator 71 which calculates the phase signal γ of the output voltage command signal V1, as $\gamma=\tan^{-1}(Vqref/Vdref)$, and a voltage command converter 72 which converts them into the voltage command signals Vuref, Vvref, Vwref of each phase of the U, V, W, from the amplitude |V1| of the output voltage command signal V1 and phase γ and inputted phase command signal θ, as Vuref= |V1|×cos(θ+γ), Vvref=|V1|×cos(θ+γ+120°), and Vwref= |V1|×cos(θ+γ+240°), are provided.

Next, the operation will be described as follows.

The voltage command signal when the current of the AC motor 9 is zero coincides with the residual voltage of the AC motor. Because, the current flows between 2 points between which the potential difference exists. Accordingly, the status in which the current between the electric power converter 1 and the AC motor 9 is zero, shows that, between the output voltage of the electric power converter 1 and the voltage of the AC motor 9, the potential difference does not exist, that is, they are at the same voltage value. In this case, the 2 axes perpendicular to each other, that is, because the current control is individually conducted by separating them into the exciting current and torque current directions, in each component voltage of the 2 axes perpendicular to each other, the output of the electric power converter 1 and the voltage of the AC motor 9 are also coincide with each other. As the result, in the residual voltage of the AC motor 9, aiming that the respective component voltage of the 2 axes perpendicular to each other appears as the d-axis voltage command value Vdref and q-axis voltage command value Vqref, in the present embodiment, the phase and angular velocity of the residual voltage of the AC motor are detected, and the re-start operation at the time of the instantaneous power failure is conducted. In the specific operation when the re-start is conducted at the time of recovery of power after the instantaneous power failure is generated, when the instantaneous power failure re-start control circuit 11 detects the instantaneous power failure, the instantaneous power failure signal is inputted into the magnetizing current command switching unit 12, torque current switching unit 13, and phase command switching unit 14. When the instantaneous power failure signal is inputted, the magnetizing current command switching unit 12 switches the exciting current command value idref into zero, and in the same manner, torque current switching unit 13 switches the torque current command value iqref into zero, and phase command switching unit 14 switches the phase command signal θ into zero. Accordingly, the output as the following expressions is conducted.

$$idref = 0$$
$$iqref = 0$$
$$\theta = 0$$

After the above operation, when the current control is conducted by the exciting current control circuit 5 and the torque current control circuit 6, the current control is conducted so that the current of the AC motor 9 becomes zero. When the current of the AC motor 9 becomes zero by the current control, the voltage is balanced, and the component voltage of 2 perpendicular axes of the residual voltage of the AC motor 9 appear as the d-axis voltage command value Vdref and the q-axis voltage command value Vqref.

Because the output γ of the voltage command phase calculator 71 shown in the drawing, into which this d-axis voltage command value Vdref and the q-axis voltage command value Vqref are inputted, coincides with the phase of the residual voltage of the AC motor 9, the phase of the residual voltage of the AC motor 9 can be easily obtained by the output γ of the voltage command phase calculator 71, and the angular velocity of the residual voltage can be easily obtained by the changing amount per unit time of the output γ of the voltage command phase calculator 71. In the same manner, this d-axis voltage command value Vdref and the q-axis voltage command value Vqref are the input. The output |V1| of the voltage command amplitude calculator 70 shown in FIG. 2 coincides with the amplitude of the residual voltage. When the above operations are completed, the instantaneous power failure re-start control circuit 11 sets the output γ of the voltage command phase calculator 71 as the initial value to the integrator 10, and sets the changing amount per unit time of the output γ of the voltage command phase calculator 71 to the speed estimation signal ωr in the current vector control circuit 2, and sets the output |V1| of the voltage command amplitude calculator 70 to the Eref of the output of the V/f converter circuit 208, and the relief signal of the instantaneous power failure signal is respectively inputted into the magnetizing current command switching unit 12, torque current switching unit 13, and phase command switching unit 14. After the magnetizing current command switching unit 12 and torque current switching unit 13 respectively switch the exciting current command value idref and torque current command value iqref to each current command signal which is the output signal of the current vector control circuit 2, and the phase command switching unit 14 switches the phase command signal θ to the output signal of the integrator 10, they are operated again, and continuously drive the AC motor 9.

FIG. 3 is an example of the operation waveform when the operation principle as described above is applied to the AC motor 9 which is free-run in the normal rotation direction, and FIG. 3(a) is a voltage command signal waveform, and FIG. 3(b) is a view showing the phase γ. As shown in FIG. 3(a), when the AC motor 9 is in the normal rotation, the d-axis voltage command value Vdref advances by the phase 90° to the q-axis voltage command value Vqref, and the amplitudes of respective voltage signals attenuate as the passage of time. Further, in the case of FIG. 3(b), it is the case where the output γ of the voltage command phase calculator 71 is rotated in the positive side. Further, although not shown, when the AC motor 9 is in the reverse rotation, the d-axis voltage command value Vdref is delayed by the phase 90° to the q-axis voltage command value Vqref, and the amplitude of respective voltage signals attenuates as the passage of time in the same manner, and the output γ of the voltage command phase calculator 71 is rotated in the reverse side. In this connection, up to this case, it is described that, when the current of the AC motor 9 becomes zero, the residual voltage of the AC motor 9 appears as the d-axis voltage command value Vdref and the q-axis voltage command value Vqref, however, even when the current of the AC motor 9 does not perfectly become zero, the detection of the phase and angular velocity can be conducted.

Figure 4:
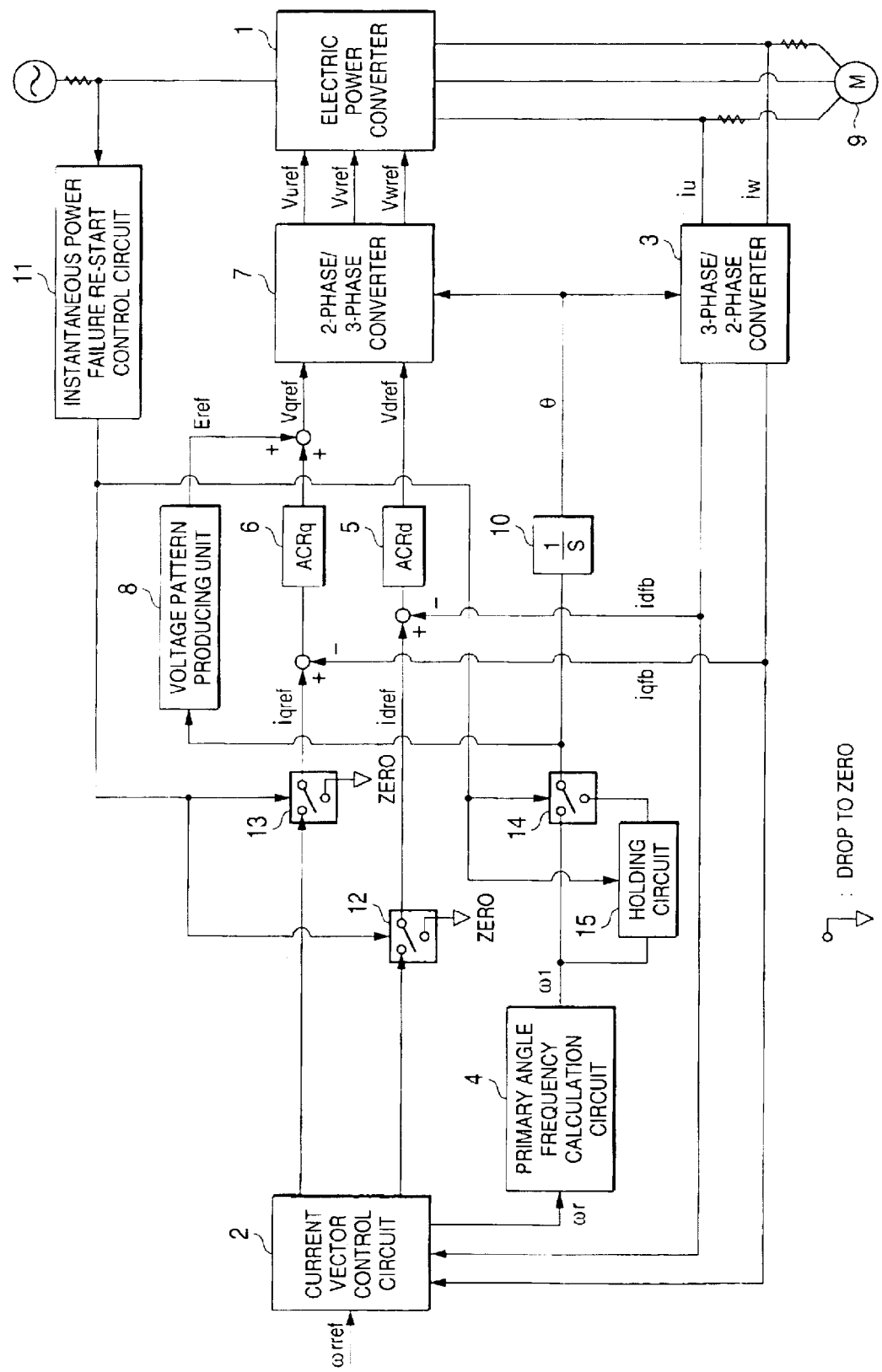
FIG. 4 is a block diagram of the variable speed control apparatus of the AC motor according to the second embodiment of the present invention.

Next, referring to FIG. 4, the second embodiment of the present invention will be described. FIG. 4 is a block diagram of the variable speed control apparatus of the AC motor according to the second embodiment of the present invention. The second embodiment shown in FIG. 4 is an improved example to avoid the disadvantages because the disadvantages are generated sometimes, in which, in the operation of previous embodiment shown in FIG. 1, in order to switch the phase command switching unit 14 to zero at the time of generation of the instantaneous power failure, the phase command signal θ becomes discontinuous, thereby, the mechanical shock is generated, or the DC voltage of the electric power converter 1 becomes the over voltage, thereby, the variable speed control apparatus trips. In the second example in FIG. 4, the different structure from FIG.

1 is as follows: by the instantaneous power failure signal outputted from the instantaneous power failure re-start control circuit 11, in place of making the phase command signal θ zero, a new signal holding circuit 15 is provided, and in the signal holding circuit 15, the primary angular frequency signal $\omega_1$ is held, and the held value is inputted into the V/f converter circuit 208, and the integrator 10, and when re-started by the recovery of power failure, in place of the case in which the phase of the AC motor 9 is obtained by the output γ of the voltage command calculator 71, and the angular velocity of the residual voltage is obtained by the changing amount pert unit time of the output γ, the phase of the residual voltage of the AC motor 9 is obtained by the addition value of the output γ of the voltage command calculator 71 and the phase command signal θ, and the angular velocity of the residual voltage is obtained by the changing amount per unit time of the addition value of the output γ and the phase command signal θ. In this connection, other same structures as in FIG. 1 are denoted by the same reference numbers, and double explanations will be neglected.

Next, the operation will be described.

In also the structure in FIG. 4, in the same manner as in FIG. 1, at the time of the instantaneous power failure, the current of the magnetizing current command switching unit 12 and the torque current switching unit 13 is switched into zero by the instantaneous power failure signal, and by the exciting current control circuit 206 and the torque current control circuit 6, the current control is conducted so that the current of the AC motor 9 becomes zero, and because the voltage component of 2 perpendicular axes of the residual voltage appears as the d-axis voltage command value Vdref and the q-axis voltage command value Vqref, and as shown in FIG. 2, the phase of the residual voltage of the AC motor is obtained by the addition value (θ+γ) of the output γ of the voltage command phase calculator 71 and the phase command signal θ, and the angular velocity is obtained by the changing amount per unit time of the addition value (θ+γ). In this case, because the primary angular frequency ω1 is switched to the held side by the signal holding circuit 15 at the time of instantaneous power failure, the primary angular frequency ω1 from the signal holding circuit 15 is added to the integrator 10, and the phase command signal θ is continuously outputted from the integrator 10, and the addition value (θ+γ) is obtained. By this operation, because the discontinuous operation of the phase command signal θ at the time of instantaneous power failure occurrence does not exist, the occurrence of the mechanical shock or the trip of the variable speed control apparatus can be avoided.

Further, in the re-start after the power recovery, by conducting the same recovery procedure as in FIG. 1, when the re-start is conducted and the AC motor 9 is driven, the quick and smooth re-start becomes possible, and the situation in which the inverter stop by the instantaneous power failure results in the stop of the whole equipments of the production line, and the damage is expanded, can be avoided.

In this connection, in the present invention, in order to remove the discontinuity of the phase command signal θ at the generation time of the instantaneous power failure, the holding circuit 15 is provided, thereby, the primary angular frequency is held, however, in place of the holding circuit 15, a command switching unit is provided, and at the generation time of the instantaneous power failure, even when the primary angular frequency is also switched to zero, because the discontinuity of the phase command signal θ can be removed, the same effect as in the present invention can be obtained.

Further, in the present invention, hitherto, the variable speed control apparatus to conduct the vector control in which the exciting current of the AC motor 9, and the torque current are respectively independently controlled, is described, however, in also the variable speed control apparatus to conduct the V/f constant control, at the time of re-start after the instantaneous power failure, in the case where the current control section by which the exciting current of the AC motor and the torque current are respectively independently controlled, is added, when the primary current is circulated and the magnetic flux of the AC motor is built up, the present invention can be conducted in the same manner.

Figure 5:
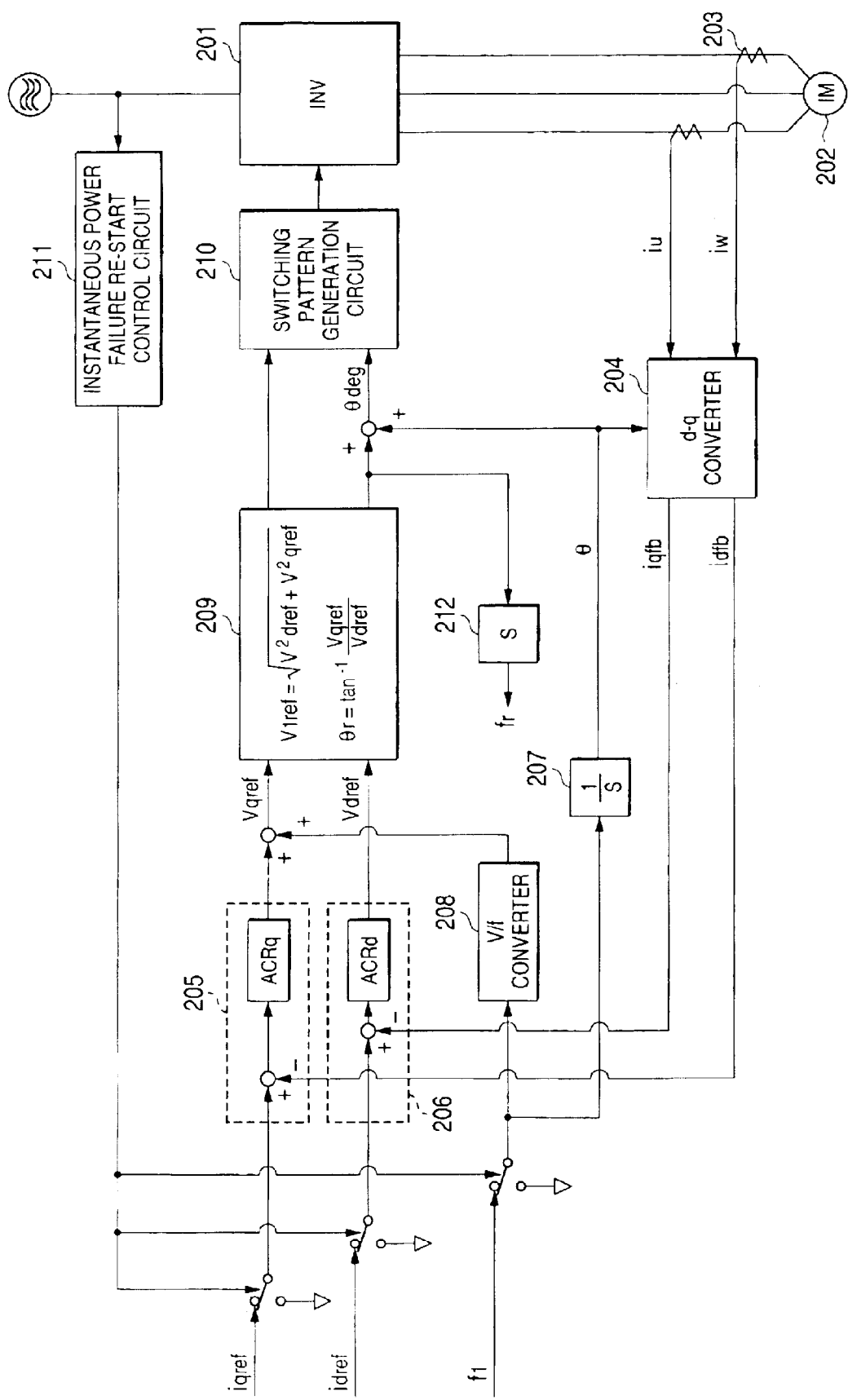
FIG. 5 is a block diagram of the control apparatus of the AC motor according to the third embodiment of the present invention.

Next, the third embodiment of the present invention will be described. FIG. 5 is a block diagram showing the structure of the third embodiment of the control apparatus of the AC motor in the present invention. The control apparatus of the motor in the present embodiment is provided with: the electric power converter 201; AC motor 202; current detector 203; current coordinate conversion circuit 204; torque current control circuit 205; exciting current control circuit 206; phase calculation circuit 207; V/f converter circuit 208; output voltage calculation circuit 209; switching pattern generation circuit 210; instantaneous power failure re-start control circuit 211; and speed estimation circuit 212. The electric power converter 201 converts the DC voltage into which the 3 phase AC is converted by the power element, into the AC of the arbitrary frequency f1 and voltage by the PWM control system, and supplies it to the AC motor 202. The current detector 203 detects the current supplied to the AC motor 202.

The current coordinate conversion circuit 204 separates the current detected by the current detector 203 into the torque current detection value 1 qfb and the exciting current detection value idfb.

The torque current control circuit 205 calculates the first q-axis voltage command value V' qref so that the given torque current command value iqref and the torque current detection value idfb coincide with each other.

The exciting current control circuit 206 calculates the d-axis voltage command value Vdref so that the given exciting current command value idref and the exciting current detection value idfb coincide with each other.

The phase calculation circuit 207 calculates the phase θ by integrating the given frequency f1.

The V/f converter circuit 208 calculates the voltage e corresponding to the induced voltage of the AC motor from the given frequency f1.

The output voltage calculation circuit 209 adds the first q-axis voltage command value V' qref which is the output of the torque current control circuit 205 and the voltage e which is the output of the V/f converter circuit 208, and calculates the second q-axis voltage command value Vqref, and from the second q-axis voltage command value Vqref and the d-axis voltage command value Vdref, the output voltage command value V1ref and its voltage phase θv are outputted.

The switching pattern generation circuit 210 determines the switching pattern of the electric power converter 1 from the electric power converter output phase θdeg in which the output voltage command value V1ref and the voltage phase θv and the phase θ are added.

The instantaneous power failure control circuit 211 controls the electric power converter 201 so that it is normally operated, when the power source recovers and re-starts, or the operation command is inputted and started, after the detection of the instantaneous power failure.

The speed estimation circuit 212 is a circuit to estimate the speed fr of the AC motor 2 in the free run condition.

Next, before explaining the operation principle of the re-start method at time of instantaneous power failure occurrence, by using the relationship of the locus of the residual voltage in FIG. 6, and the voltage command and phase, the method to estimate the speed of the AC motor 202 in the free run condition will be described. The AC motor 202 in the free run condition at the time of the instantaneous power failure during the normal operation generates the residual voltage, and the locus of the voltage is rotated as the left view at the rotation speed of the AC motor 202. Therefore, when the electric power converter 201 is started to be operated irrespective of the condition of the AC motor 202, the current circulates between the AC motor 202 and the electric power converter 201. However, when the residual voltage of the AC motor 202 and the amplitude, phase and frequency of the output voltage of the electric power converter coincide with each other, the current does not circulate. In order to make the current circulating between the electric power converter 201 and the AC motor 202 zero, the torque current command value iqref and the exciting current command value idref and frequency f1 are set to zero, and in the torque current control circuit 205, and exciting current control circuit 206, it may be controlled so that the torque current detection value iqfb and exciting current detection value idfb flowing to the AC motor 202 respectively coincide with the command values. This is called the zero current control. The first q-axis voltage command value V' qref and d-axis voltage command value vdref which are the output of the torque current control circuit 205, and the exciting current control circuit 206 at the time of the zero current control, become the sinusoidal voltage command values of the frequency f1 which coincides with the rotation speed of the AC motor 202 as shown in FIG. 6(b) upper side view.

When the frequency f1 is set to zero, the phase θ outputted from the phase calculation circuit 207 is fixed, and the voltage Eref outputted from the V/f converter circuit 208 becomes zero.

The output voltage calculation circuit 209 has the first q-axis voltage command value V' qref and the d-axis voltage command value Vdref as the inputs, and outputs the output voltage command value V1ref and the voltage phase θv. The output voltage command value V1ref expresses the amplitude of the residual voltage, and the voltage phase θv expresses the phase of the residual voltage.

Therefore, as shown in FIG. 6(b) lower side view, when the time change of the phase of the residual voltage is measured at every time, the speed estimation circuit 212 measures the frequency of the residual voltage. Because the frequency of the residual voltage coincides with the rotation speed of the AC motor 202, the rotation speed of the AC motor 202 in the free run condition can be estimated. Although FIG. 6 is considered about the case where the AC motor is normally rotated, when the AC motor is reversely rotated, because only the rotation direction of the phase of the residual voltage is different, it can be considered in the same manner. This is shown in FIG. 7. In this manner, when the residual voltage is measured, including the rotation direction of the AC motor, the rotation speed can be estimated.

Next, the operation when the re-start is conducted at the time of the power recovery after the instantaneous power failure, will be described. When the instantaneous power failure occurs during the operation of the AC motor 202, the electric power converter 201 stops the operation, and the AC motor 202 is in the free run condition. When the power is recovered, and the electric power converter 201 is in the operable condition, the instantaneous power failure re-start circuit 211 forcibly makes the torque current command value iqref and the exciting current command value idref and the frequency zero. Then, the zero current control is conducted, and the output voltage command value V1ref and its voltage phase θv which are the amplitude and phase of the residual voltage of the AC motor 202, are calculated from the output voltage calculation circuit 209.

The instantaneous power failure re-start control circuit 211, when the output voltage command value V1ref outputted from the output voltage calculation circuit 209 is larger than the arbitrary set voltage level, makes the voltage phase θv the input, and the speed estimation circuit 212 controls that the estimation value fr of the rotation speed of the AC motor is outputted.

When the output voltage command value V1ref outputted from the output voltage calculation circuit 209 is smaller than the arbitrary set voltage level, because the AC motor 202 is stopped or rotated at the low speed, it can not be judged whether the output voltage command value V1ref is small, or the AC motor is rotated at the high speed, but the residual voltage is reduced small, because the instantaneous power failure time is longer than the secondary constant of the AC motor. Therefore, the instantaneous power failure re-start control circuit 211 flows the arbitrary level DC current for an arbitrary set time, and tries the excitation again, and the zero current control is conducted once more, and calculates the output voltage command value V1ref and its voltage phase θv which are the amplitude and phase of the residual voltage of the AC motor 202, from the output voltage calculation circuit 209.

Then, when the output voltage command value V1ref outputted from the output voltage calculation circuit 209 is larger than the arbitrarily set voltage level, the instantaneous power failure re-start control circuit 211 makes the voltage phase θv as the input, and the speed estimation circuit 212 controls that the estimation value fr of the rotation speed of the AC motor is outputted.

After the re-exciting is conducted, when the output voltage command value V1ref outputted from the output voltage calculation circuit 209 is smaller than the arbitrarily set voltage level, the instantaneous power failure re-start control circuit 211 makes the voltage phase θv as the input, and the speed estimation circuit 212 controls that it is judged that the AC motor is stopped. As described above, the instantaneous power failure re-start control circuit 211 observes the output voltage command value V1ref outputted from the output voltage calculation circuit 209, and when the speed estimation circuit 212 makes the speed of the AC motor as the output value of the estimation value, the instantaneous power failure re-start control circuit 211 stops the zero current control, and enters in the normal operation condition. When the condition is shifted from the zero current control condition to the normal operation, even when only the frequency f1 is made to coincide and the electric power converter 201 is started, the over current flows in the AC motor, thereby, there is a possibility that the smooth start can not be conducted. In order to prevent this, the amplitude and phase of the residual voltage in the zero current control may be continued even at an instance when the zero current control is shifted to the normal operation. The instantaneous power failure re-start control circuit 211 controls that the initial value is set to the output voltage command value V1ref of the electric power converter and the electric power converter output phase θ deg and output frequency f1. The output voltage command value V1ref of the electric power converter sets the output voltage command value V1ref calculated by the output voltage calculation circuit 209 in the zero-current control. Herein, because the residual voltage measured by the zero current control is the induced voltage e of the AC motor 202, as the initial value of the output voltage Eref of the V/f converter 208, the output voltage command value V1ref calculated by the output voltage calculation circuit 209 is set in the zero current control. The initial value of the output frequency f1 sets the estimation value fr of the rotation speed of the AC motor 202 outputted by the speed estimation circuit 212.

In the normal operation condition, although the electric power converter output phase θ deg is controlled on the basis of the phase of the magnetic flux of the AC motor 202, during the zero current control, because the phase of the induced voltage e of the AC motor 202 is outputted, the phase advances by 90° at the time of normal rotation, and the phase is delayed by 90° at the time of reverse rotation. Accordingly, the initial value of the electric power converter output phase θ deg, after the phase is corrected by 90° corresponding to the rotation direction from the last phase of the zero current control, the value in which the advanced amount of the phase is corrected, by the estimation value fr of the rotation speed of the AC motor 202 outputted by the speed estimation circuit 212, is set. When the initial value of the output voltage Eref of the V/f converter 208 is smaller than the normal induced voltage of the AC motor 202, the instantaneous power failure re-start control circuit 211 controls that the initial value of the output voltage Eref of the V/f converter 208 is gradually increased until it corresponds to the normal induced voltage. When the above described operations are completed, because the operation becomes the normal operation condition, the operation of the instantaneous power failure re-start control circuit 211 is completed.

Figure 8:
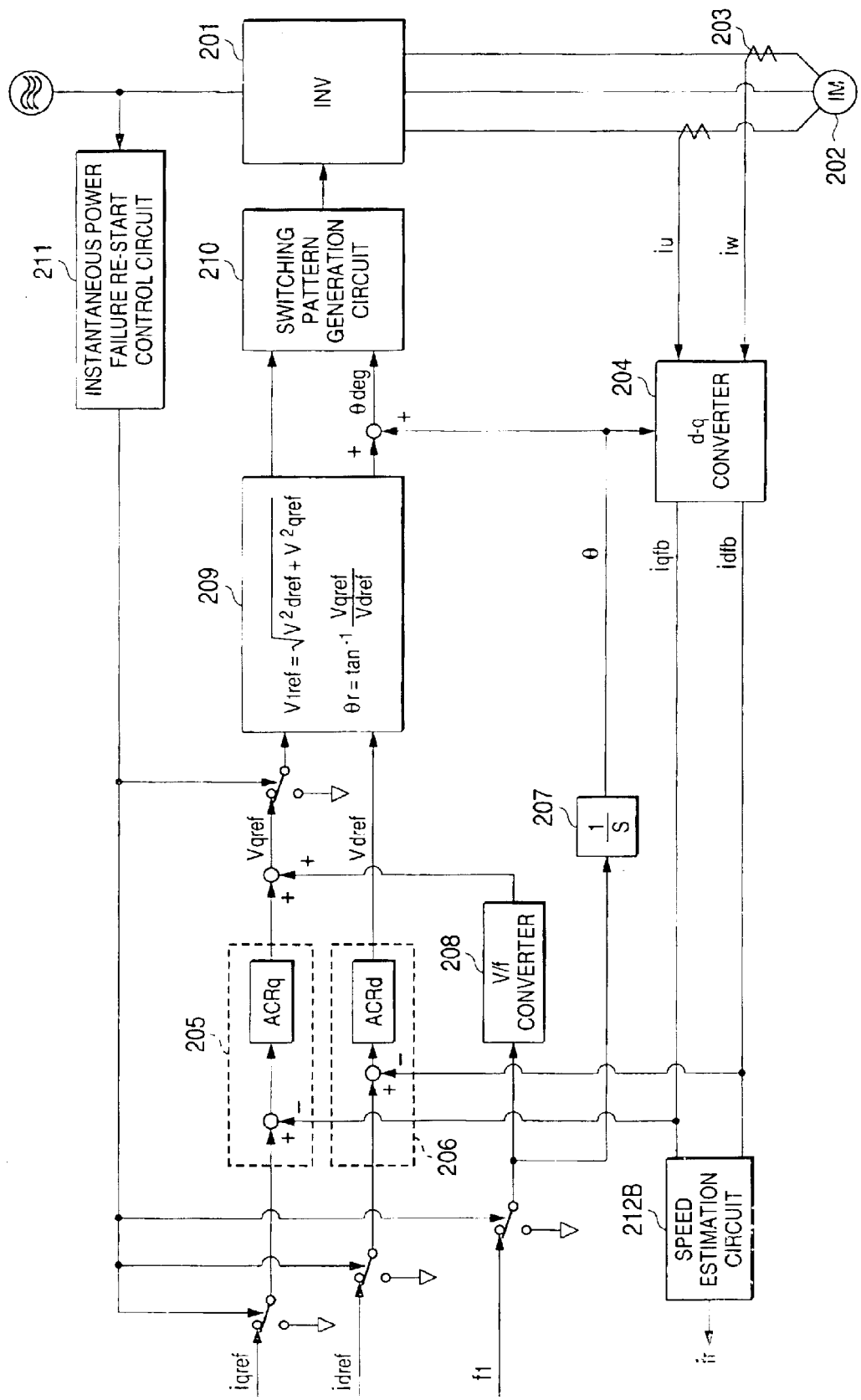
FIG. 8 is a block diagram of the control apparatus of the AC motor according to the fourth embodiment of the present invention.

Further, FIG. 8 is a block diagram showing the structure of the fourth embodiment of the control apparatus of the AC motor in the present invention. The control apparatus of the motor in the present embodiment is provided with: the electric power converter 201; AC motor 202; current detector 203; current coordinate conversion circuit 204; torque current control circuit 205; exciting current control circuit 206; phase calculation circuit 207; V/f converter circuit 208; output voltage calculation circuit 209; switching pattern generation circuit 210; instantaneous power failure re-start control circuit 211; and speed estimation circuit 212B. In the fourth embodiment, because the structure is almost the same as the third embodiment, the explanation is omitted. The speed estimation circuit 212A of the third embodiment and the speed estimation circuit 212B of the fourth embodiment has the same function except a point that the input is only different.

Next, by using the change of the current detection value when the d-axis voltage is given to the AC motor in FIG. 9, a method by which the speed of the AC motor 202 in the free run condition when no residual voltage exists, is estimated, will be described. The AC motor 202 in the free run condition at the time of the instantaneous power failure generates the residual voltage, however, when the instantaneous power failure time is longer than the secondary circuit time constant of the AC motor, the residual voltage disappears. In this case, in the third embodiment, the speed of the AC motor can not be estimated. Therefore, in the fourth embodiment, the exciting current is circulated in to the AC motor in the free run, and the frequency f1 of the secondary current transiently circulating in the rotor when the magnetic flux is built up is detected, and the speed of the AC motor is estimated.

Initially, in order to excite the AC motor, a set value is given to the exciting current command idref, and zero is respectively given to the torque current command, and the exciting current control circuit 206 controls so that the exciting current detection value idfb coincides with the exciting current command idref. In order to obtain the motor speed information, the torque current control circuit 205 does not control. When if the motor is in the stopped condition, because the voltage necessary for the d-axis is only the primary resistance drop voltage, the primary resistance drop voltage is given to the d-axis voltage command Vd* as the initial value, and the q-axis voltage command Vq* is made zero. Because the speed of the AC motor is unknown, the frequency is also made zero. This is equivalent to a case where the DC voltage command Vdref is given to an arbitrary phase. In this case, when the AC motor 2 is rotated, the torque current detection value iqfb changes as in FIG. 9. The frequency of the torque current detection value iqfb coincides with the speed of the AC motor 202 in the free run condition. When the frequency of this torque current detection value iqfb is measured, the speed of the AC motor 202 can be detected.

In FIG. 9, although a case where the AC motor is normally rotated, is considered, but in a case where the AC motor is reversely rotated, the relationship between the phases of the exciting current detection value idfb and the torque current value iqfb is different. This is shown in FIG. 10.

In this manner, in the case of normal rotation, the exciting current detection value idfb is more advanced than the torque current detection value iqfb, and in the case of reverse rotation, the exciting current detection value idfb is more delayed than the torque current detection value iqfb. In this manner, when the DC voltage is applied, the rotation speed can be estimated including the rotation direction of the AC motor.

When the free run speed of the motor is low, because the amplitude is hardly generated in the exciting current detection value idfb, the rotation direction can not be detected only by this method. However, when the motor is rotated, the sinusoidal signal appears in the torque current detection value iqfb. In the case of the normal rotation, the sinusoidal signal begins from the phase 180°, and in the case of reverse rotation, it begins from the phase 0°. In this manner, the rotation direction can be detected depending on from which phase it begins.

The operation in the case where the electric power is recovered after the instantaneous power failure occurs, will be described. When the instantaneous power failure occurs while the AC motor 202 is operated, the electric power converter 201 stops the operation, and the AC motor 202 becomes the free run condition. When the power source recovers and the electric power converter 201 becomes the operable condition, the instantaneous power failure re-start circuit 211 makes the torque current command value iqref and the exciting current command value idref and the frequency f1 forcibly zero. Then, the zero current control is conducted, and from the output voltage calculation circuit 209, the output voltage command value V1ref and its voltage phase θv which are the amplitude and the phase of the residual voltage of the AC motor 2, are calculated.

When the output voltage command value V1ref outputted from the output voltage calculation circuit 209 is smaller than the arbitrarily set voltage level, the instantaneous power failure re-start control circuit 211 can not judge that, because the AC motor 202 stops or is rotated at low speed, whether the output voltage command value V1ref is small, or although the AC motor is rotated at high speed, because the instantaneous power failure time is longer than the secondary time constant of the AC motor, whether the residual voltage is decreased. Therefore, when the instantaneous power failure re-start control circuit 211 impresses the DC voltage of the arbitrary level for an arbitrarily set time period, the DC current flows, and the exciting current detection value idfb and the torque current detection value iqfb are inputted into the speed estimation circuit 212B, and it is controlled that the estimation value of the rotation speed of the AC motor is outputted by the above described method. When the speed estimation circuit 212B outputs the speed estimation value of the AC motor, the instantaneous power failure re-start control circuit 211 stops the impression of the DC voltage, and enters into the normal operation. When the condition is shifted from the DC voltage impression condition to the normal operation, the frequency f1 corresponding to the speed estimation value outputted from the speed estimation circuit 212B may be set to the electric power converter 201, however, when the AC motor is started by giving the voltage command which is the induced voltage corresponding to the rotation speed of the AC motor, the over current flows in the AC motor, and there is a possibility that the smooth start can not be conducted. In order to prevent this, the instantaneous power failure re-start control circuit 211 controls that the output voltage of the V/f converter 8 is gradually increased until it corresponds to the normal induced voltage of the AC motor 202.

In the above described embodiments, it is considered that only the exciting current control circuit 206 is operated, however, only the torque current control circuit 205 may be operated, or neither current control circuits may also be operated. Further, the DC voltage command may also be given to the q-axis direction.

Figure 11:
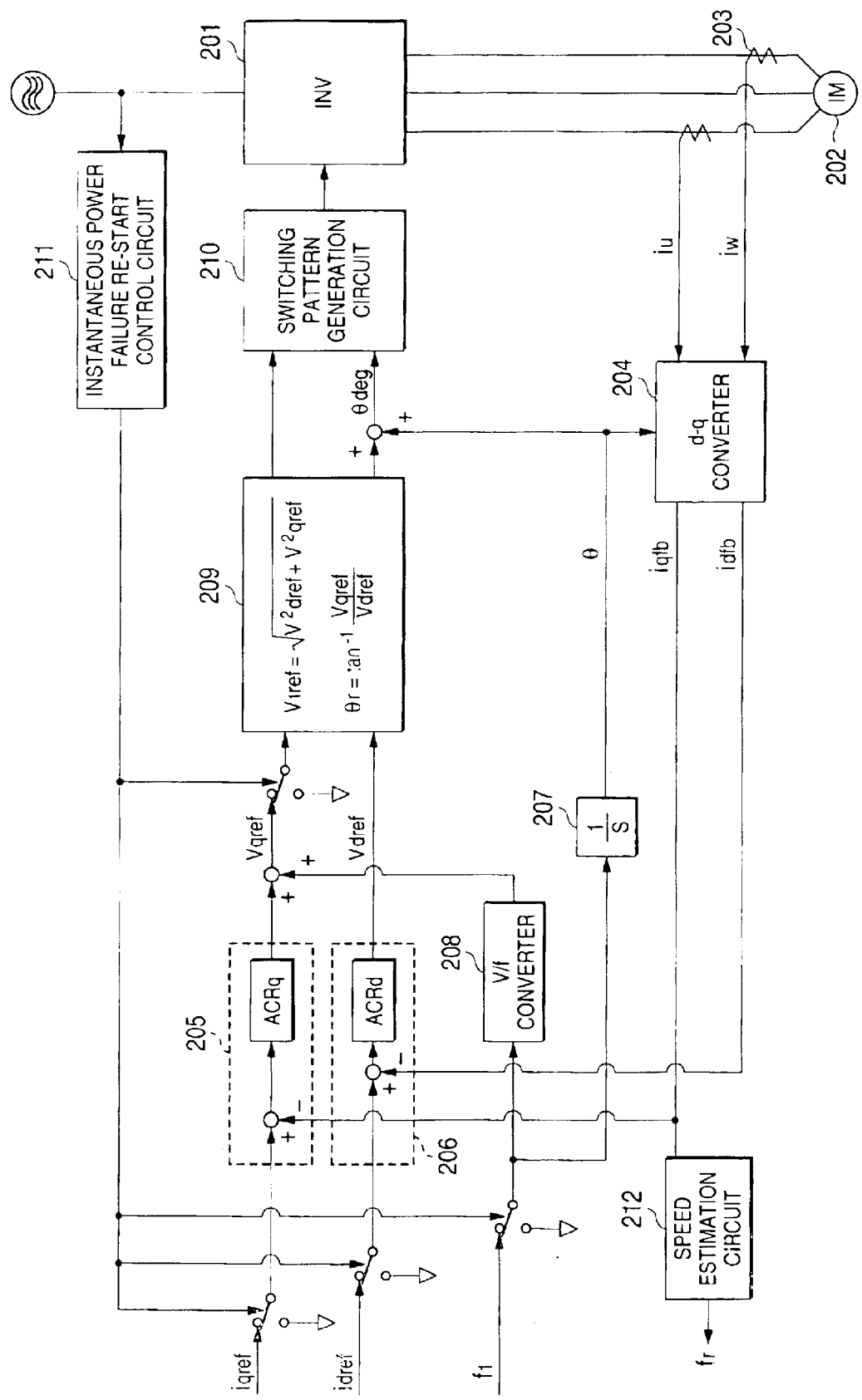
FIG. 11 is a block diagram of the control apparatus of the AC motor according to the fifth embodiment of the present invention.

Next, referring to the drawings, the fifth embodiment of the present invention will be described. FIG. 11 is a block diagram showing the structure of the fifth embodiment of the control apparatus of the AC motor in the present invention. The control apparatus of the motor in the present embodiment is provided with: the electric power converter 201; AC motor 202; current detector 203; current coordinate conversion circuit 204; torque current control circuit 205; exciting current control circuit 206; phase calculation circuit 207; V/f converter circuit 208; output voltage calculation circuit 209; switching pattern generation circuit 210; instantaneous power failure re-start control circuit 211, and speed estimation circuit 212.

The electric power converter 201 converts the DC voltage into which the 3 phase AC is converted by the power element, into the AC having an arbitrary frequency and voltage by the PWM control system, and supplies it to the AC motor 202.

The current detector 203 detects the current supplied to the AC motor 202. The current coordinate conversion circuit 204 separates the current detected by the current detector 203 into the torque current detection value iqfb and the exciting current detection value idfb. The torque current control circuit 205 calculates the first q-axis voltage command value Vqref so that the given torque current command value iqref and the torque current detection value iqfb coincide with each other.

The exciting current control circuit 206 calculates the d-axis voltage command value Vdref so that the given exciting current command value idref and the exciting current detection value idfb coincide with each other.

The phase calculation circuit 207 calculates the phase by integrating the given frequency f1.

The V/f conversion circuit 208 calculates the voltage Eref corresponding to the induced voltage of the AC motor from the given frequency f1.

The output voltage calculation circuit 209 adds the first q-axis voltage command value Vqref which is the output of the torque current control circuit 5 to the voltage Eref which is the output of the V/f converter circuit 208, and calculates the second q-axis voltage command value Vqref, and from the second q-axis voltage command value Vqref and the d-axis voltage command value Vdref, outputs the output voltage command value V1ref and its voltage phase θv.

The switching pattern generation circuit 210 determines the switching pattern of the electric converter 201 from the electric converter output phase θdeg in which the output voltage command value V1ref and the voltage phase θv and phase are added to each other.

The instantaneous power failure re-start control circuit 211 controls the electric converter 201 so that it is normally operated, after the instantaneous power failure is detected, when the re-start is conducted after the power source is recovered, or when the motor is started after the operation command is inputted.

The speed estimation circuit 212 is a circuit to estimate the speed fr of the AC motor in the free run condition.

Next, the method to estimate the speed of the AC motor 202 in the free run condition in the case of no residual voltage, will be described, by using the change of the current detection value when the d-axis voltage is given to the AC motor in FIG. 12. The AC motor 202 in the free run condition due to the instantaneous power failure generates the residual voltage, however, when the instantaneous power failure time is longer than the secondary circuit time constant of the AC motor, the residual voltage disappears. Therefore, in the second embodiment, the exciting current flows to the AC motor in the free run condition, and when the magnetic flux is built up, the frequency of the secondary current transiently flowing in the rotor is detected, thereby, the speed of the AC motor is estimated.

Initially, in order to excite the AC motor, a certain set value is given to the exciting current command idref and the zero is respectively given to the torque current command iqref, and the exciting current control circuit 206 controls so that the exciting current detection value id coincides with the exciting current command idref for a set time period. After that, the sign and the amplitude of the exciting current command idref are changed, and the control is conducted for the set time period. In order to obtain the motor speed information, the torque current control circuit 205 is not controlled. The d-axis voltage command Vdref and the q-axis voltage command are made zero. Because the speed of the motor is unknown, the frequency is also made zero. In this case, when the AC motor 202 is rotated, the torque current detection value iqfb changes as shown in FIG. 12. When the sign of the exciting current command is negative, the torque current detection value iqfb is changed to the sinusoidal wave whose phase begins from 0°, and when the sign of the exciting current command is positive, the torque current detection value iqfb is changed to the sinusoidal wave whose phase begins from 180°. The frequency of the sinusoidal wave of the torque current detection value iqfb coincides with the speed of the AC motor 202 in the free run condition. By measuring the frequency of this torque current detection value iqfb, the speed of the AC motor 202 can be detected.

Figure 12:
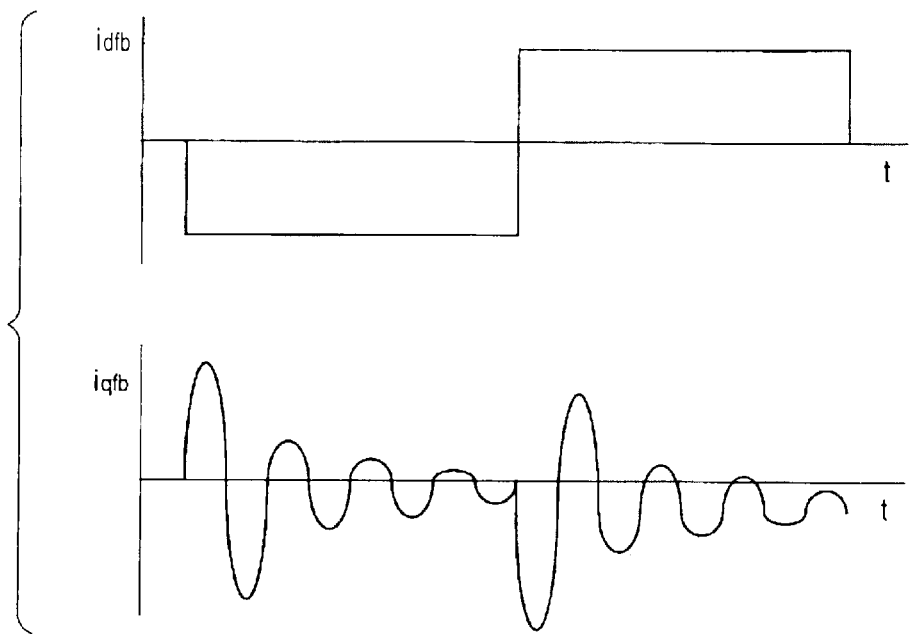
FIG. 12 is a diagram showing a variation (normal rotation) of a torque current detection value when an exciting current command is given to the AC motor.
Figure 13:
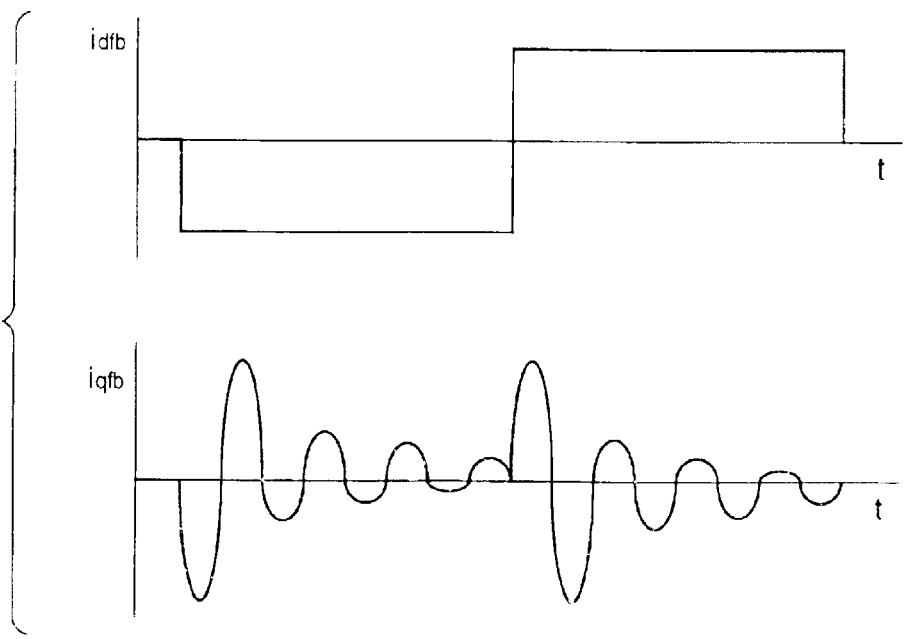
FIG. 13 is a diagram showing a variation (reverse rotation) of the torque current detection value when the exciting current command is given to the AC motor.

Although, in FIG. 12, a case where the AC motor 202 is normally rotated, is considered, when the AC motor 202 is reversely rotated, the waveform as shown in FIG. 13 is obtained. As described above, when the sign of the exciting current command idref is positive, in the case of the normal rotation, the phase of the torque current detection value iqfb begins from 0°, and in the case of the reverse rotation, the phase begins from 180°. As described above, when the exciting current command idref is given and controlled, including the rotation direction of the AC motor 202, the rotation speed can be estimated.

Next, the operation when the re-start is conducted due to the power recovery after the occurrence of the instantaneous power failure, will be described. When the instantaneous power failure occurs during the operation of the AC motor, the electric power converter 201 stops the operation, and the AC motor 202 becomes the free run condition. When the power source is recovered, and the electric power converter 201 becomes the operable condition, the instantaneous power failure re-start control circuit 211 forcibly makes the torque current command value iqref and exciting current command value idref and frequency f1 zero. Then, the zero current control is conducted, and from the output voltage calculation circuit 209, the output voltage command value V1ref and its voltage phase θv which are the amplitude and phase of the residual voltage of the AC motor, are calculated. The instantaneous power failure re-start control circuit 211 can not judge, when the output voltage command value V1ref outputted from the output voltage calculation circuit 209 is smaller than the arbitrarily set voltage level, because the AC motor 202 is stopped or rotated at the low speed, whether the output voltage command value V1ref is small, or whether, although the AC motor is rotated at high speed, because the instantaneous power failure time is longer than the secondary time constant of the AC motor 202, the residual voltage becomes small. Therefore, after the instantaneous power failure re-start control circuit 211 gives the DC current command to the exciting current command value idref for an arbitrarily set time period, the sign and amplitude of the DC current command are changed and the current control is conducted, and the torque current detection value iq is inputted into the speed estimation circuit 212, and it is controlled that, by the above described method, the estimation value of the rotation speed of the AC motor 202 is outputted.

The instantaneous power failure re-start control circuit 211 stops the current control when the arbitrarily set time is passed, and because the speed estimation circuit 212 outputs the speed estimation value of the AC motor 202, it enters into the normal operation condition. When the condition is shifted from the DC voltage application condition to the normal operation, the frequency corresponding to the speed estimation value outputted from the speed estimation circuit 212 may be set in the electric power converter 201, however, when the voltage command which is the induced voltage corresponding to the rotation speed of the AC motor is given and started, there is a possibility that the over current flows to the AC motor 202, and thereby, the smooth start can not be conducted. In order to prevent this, the instantaneous power failure re-start control circuit 211 controls that the output voltage of the V/f converter 8 is gradually increased until it corresponds to the normal induced voltage of the AC motor 202.

In the above examples, it is considered that only the exciting current control circuit 206 is operated, however, only the torque current control circuit 205 may be operated, or neither current control circuits may also be operated.

Further, even when the exciting current command value idref is given and the current control is not conducted, when the DC voltage is applied, because the same phenomenon is generated, the speed estimation and rotation direction detection become possible.

Further, when no residual voltage exists, the exciting current command value idref may be in one direction, however, when the residual voltage exists, by the amplitude and phase of the residual voltage, because the movement in the case of the first time exciting current command value idref is changed, although the detection of the motor speed is possible, the rotation direction is detected in the case of the second time exciting current command value idref.

Further, when the motor speed is high, by also utilizing the phenomenon that, in the case of the normal rotation, the exciting current detection value idfb advances more than the torque current detection value iqfb, and in the case of the reverse rotation, the exciting current detection value idfb delays more than the torque current detection value iqfb, the rotation direction can be detected.

Further, the electric power conversion apparatus is described as the electric power conversion apparatus by which the vector control is conducted in such a manner that the current flowing in the AC motor 2 is separated into the torque current and the exciting current, and respectively controlled independently, however, in also the electric power conversion apparatus by which the V/f constant control is conducted, when the current control circuit by which the current flowing in the AC motor in the case of the instantaneous power failure, is separated into the torque current and the exciting current, and respectively controlled independently, is added, the present invention can be conducted in the entirely same process. Further, in the above embodiment, it is described as the operation in the instantaneous power failure re-start time, however, even when the AC motor is started when it is in the free run condition for a long period of time, the present invention can be conducted in the same processing as the above.

When conducted in this manner, also when the residual voltage exists in the AC motor or not, because the speed of the AC motor can be estimated, there is an advantage that the re-operation can be conducted quickly and smoothly at the instantaneous power failure re-start time.

Industrial Possibility of Use

As described above, according to the present invention, when the AC motor is in the free run condition, the current control is forcibly conducted so that the current of the AC motor is made zero, and on the base of the output voltage command signal to calculate by using the current control section output in this case, because the phase and angular velocity of the residual voltage of the AC motor are obtained, there is an effect that the phase and angular velocity of the residual voltage can be accurately measured, and the re-operation can be conducted quickly and smoothly at the instantaneous power failure re-start time. Further, when the phase and angular velocity of the residual voltage is obtained, because the previous speed signal is held in the holding circuit, and from the value to which the phase command signal is added, the phase and angular velocity of the residual voltage are obtained, there is an effect that the continuity of the phase command signal is maintained, and the mechanical shock and the trip of the variable speed control apparatus are prevented, and the stable operation can be conducted.

What is claimed is:

1. A method for controlling an AC motor comprising
outputting an electric power to the AC motor, and
controlling an output current of an electric power converter based on a difference signal of an output current detection signal and a current command signal of the electric power converter, wherein
when the AC motor is in a free run condition, current control is conducted by forcing the current command signal to be zero so that a current in the AC motor is made zero;
and wherein
an amplitude and phase and angular velocity of a residual voltage of the AC motor are found based on a calculated output voltage command.

2. The method of controlling the AC motor according to claim 1, wherein the phase and the angular velocity of the residual voltage are found from an addition value of a phase command signal just before the free run of the motor and a phase signal of the output voltage command.

3. The method of controlling the AC motor according to claim 1, wherein a start control circuit forces the current command to be zero, and calculates the voltage command that makes a detected current zero, and a speed of the AC motor is found by a time change of the voltage command.

4. The method of controlling the AC motor according to claim 1, wherein a start control circuit forces the current command to be zero, and calculates a voltage command that makes a detected current zero, and when a voltage level of the motor is lower than a set voltage level, after a DC current command is applied for a set time period from zero, the current command is forced to be zero again, and the voltage command that makes the detected current zero is calculated again, and the speed of the AC motor is estimated.

5. The method of controlling the AC motor according to claim 3, wherein, the start control circuit forcibly sets the current command to be zero,
the output voltage command that makes the current detection signal to be zero is calculated,
the current command is forcibly set to zero after a DC current control command is set to a level for a time period when a voltage level is lower than a set voltage level,
further the output voltage command that makes the current detection signal to be zero is calculated even when the voltage level is lower than a set voltage level, and
the speed estimation circuit estimates that the AC motor is stopped.

6. The method of controlling the AC motor according to any one of claims 1 to 5, wherein the current command is made to be zero,
the voltage command by which a detected current zero is calculated, and
a speed is estimated by the time change of the voltage command, and
the AC motor is started by making the estimated speed of the AC motor and the amplitude and phase of the voltage command as an initial value.

7. The method of controlling the AC motor according to any one of claims 1 to 5, wherein the current command is made to be zero,
the voltage command by which a detected current is made zero is calculated, and
a speed is estimated by a time change of the voltage command, and
the AC motor is started by making the estimated speed of the AC motor and the amplitude and phase of the voltage command as initial values and
an amplitude of the voltage command outputted from the electric power converter is gradually increased until the amplitude reaches the voltage level corresponding to a normal induced voltage at the speed of the AC motor.

8. A method for controlling an AC motor comprising
outputting an arbitrary electric power to the AC motor;
detecting a current in the AC motor;
coinciding a given current command with the detected current;
switching an electric power converter based on a voltage command output from a current control circuit,
wherein an amplitude and phase and angular velocity of a residual voltage of the AC motor are found based on a calculated output voltage command
wherein the electric power converter is normally operated at a start, and a speed of the AC motor in a free run condition is estimated.

9. The method of controlling an AC motor according to claim 8, wherein the start control circuit forces the current command to be zero, and calculates the voltage command that makes a detected current zero, and
when the voltage command is larger than a set voltage level, the speed estimation circuit estimates the speed of the AC motor by a time change of the phase of the voltage command, and
when the electric power converter is started, the amplitude and phase of the voltage command and the frequency corresponding to the estimated speed of the AC motor are set as initial values.

10. The method of controlling an AC motor according to claim 8, wherein a start control circuit forces the current command to be zero, and calculates the voltage command that makes a detected current zero, and
when a voltage level is lower than a set voltage level, a DC current command with a set level or the DC voltage command with a set level is applied for a set time period from zero, and
a frequency component appearing in a detected current is estimated as a speed of the AC motor, and
the frequency component is set as an initial value when the electric power converter is started.

11. The method of controlling an AC motor according to claim 8, wherein a start control circuit forces the current command to be zero, and calculates the voltage command that makes a detected current zero, and
when the voltage command is lower than a set voltage level, a current command is changed from zero to a DC current command value with a set level, and supplied for a set time period, and
a sign and the amplitude of the current command are changed, and applied for a set time period.

12. The method of controlling an AC motor according to claim 8, wherein a start control circuit forces the current command to be zero, and calculates the voltage command that makes a detected current zero, and
when the voltage command is lower than a set voltage level, a current control is stopped, and a DC current command is applied for a set time period in an arbitrary direction, and
an arbitrary amplitude current command is given in a direction in which a phase is changed by 180° from the command direction of the DC voltage, and the current control is conducted again for a set time period.

13. The method of controlling an AC motor according to claim 8, wherein a start control circuit forces the current command to be zero, and calculates the voltage command that makes a detected current zero, and
when the voltage command is larger than a set voltage level, the speed estimation circuit estimates the speed of the AC motor by the time change of the phase of the voltage command, and the amplitude and phase of the voltage command and the frequency corresponding to the estimated speed the AC motor are set as initial values and the AC motor started.

14. A control apparatus of the AC motor, comprising
an electric power converter to output an arbitrary electric power to the AC motor;

a current detection circuit to detect a current supplied to the motor; and a current control circuit which controls so that the given current command coincides with the current detection value detected by the current detection circuit, a start control circuit; and a speed estimation circuit to estimate the speed of the AC motor in the free run condition, wherein the switching of the electric power converter is determined from a voltage command outputted from the current control circuit and an amplitude and phase and angular velocity of a residual voltage of the AC motor are found based on a calculated output voltage command.

15. A control apparatus of the AC motor according to claim 14, wherein the start control circuit forces the current command to be zero, and calculates the voltage command that makes a detected current zero, and a speed of the AC motor is found by a time change of the voltage command.

16. A control apparatus of the AC motor according to claim 14, wherein the start control circuit forces the current command to be zero, and calculates the voltage command that makes a detected current zero, and when a voltage level of the motor is lower than a set voltage level, after a DC current command is applied for a set time period from zero, the current command is forced to be zero again, and the voltage command that makes the detected current zero is calculated again, and the speed of the AC motor is estimated.

17. The control apparatus according to claim 14, wherein, the start control circuit forcibly sets the current command to be zero, the current control circuit is adapted to calculate the output voltage command that makes the current detection signal to be zero, and to forcibly set the current command is forcibly to zero after a DC current control command is set to a level for a time period when a voltage level is lower than a set voltage level, further current control circuit is adapted to set the output voltage command that makes the current detection signal to be zero even when the voltage level is lower than a set voltage level, and the speed estimation circuit is adapted to estimate that the AC motor is stopped.

18. A control apparatus of the AC motor according to claim 14, the current command is made to be zero, the voltage command by which the current detection value is made zero is calculated, and a speed is estimated by a time change of the voltage command, and the AC motor is started by making the estimated speed of the AC motor and the amplitude and phase of the voltage command as initial values.

19. A control apparatus of the AC motor according to claim 14, wherein the start control circuit forcibly makes the current command zero, and the current control circuit calculates the voltage command by which a detected current is made zero, and a speed is estimated by the time change of the voltage command, the AC motor is started by making the estimated speed of the AC motor and the amplitude and phase of the voltage command as initial values, the amplitude of the voltage command outputted from the electric power converter is gradually increased until it becomes the voltage level corresponding to the normal induced voltage at the speed of the AC motor.

20. The method of controlling an AC motor according to claim 14, wherein a start control circuit forces the current command to be zero, and calculates the voltage command that makes a detected current zero, and when a voltage level is lower than a set voltage level, a DC current command with a set level or the DC voltage command with a set level is applied for a set time period from zero, and a frequency component appearing in a detected current is estimated as a speed of the AC motor, and the frequency component is set as an initial value when the electric power converter is started.

21. The method of controlling an AC motor according to claim 14, wherein a start control circuit forces the current command to be zero, and calculates the voltage command that makes a detected current zero, and when the voltage command is lower than a set voltage level, a current command is changed from zero to a DC current command value with a set level, and supplied for a set time period, and a sign and the amplitude of the current command are changed, and applied for a set time period.

22. The method of controlling an AC motor according to claim 14, wherein a start control circuit forces the current command to be zero, and calculates the voltage command that makes a detected current zero, and when the voltage command is lower than a set voltage level, a current control is stopped, and a DC current command is applied for a set time period in an arbitrary direction, and an arbitrary amplitude current command is given in a direction in which a phase is changed by 180° from the command direction of the DC voltage, and the current control is conducted again for a set time period.

23. A method of controlling an AC motor comprising
outputting an electric power to the AC motor from an electric power converter, and controlling the output current based on a difference signal of a current command signal and a detected current signal of the electric power converter, wherein when the AC motor is in the free run condition, an arbitrary DC current is supplied to the AC motor for a set time period, and a frequency component of the detected current signal of the electric power converter is detected, and a speed of the AC motor is estimated from the frequency.

* * * * *